(12) United States Patent
Gifford et al.

(10) Patent No.: US 9,023,185 B2
(45) Date of Patent: May 5, 2015

(54) LOW SCALE POTENTIAL WATER TREATMENT

(71) Applicant: Siemens Industry, Inc., Alpharetta, GA (US)

(72) Inventors: Joseph D. Gifford, Marlborough, MA (US); John W. Arba, Bradford, MA (US); Evgeniya Freydina, Acton, MA (US); Anil D. Jha, Lincoln, MA (US); Li-Shiang Liang, Harvard, MA (US); Lu Wang, Beijing (CN)

(73) Assignee: Evoqua Water Technologies LLC, Warrendale, PA (US)

( * ) Notice: Subject to any disclaimer, the term of this patent is extended or adjusted under 35 U.S.C. 154(b) by 140 days.

(21) Appl. No.: 13/690,866

(22) Filed: Nov. 30, 2012

(65) Prior Publication Data
US 2013/0126355 A1 May 23, 2013

Related U.S. Application Data

(63) Continuation of application No. 11/767,438, filed on Jun. 22, 2007, now abandoned.

(60) Provisional application No. 60/912,548, filed on Apr. 18, 2007, provisional application No. 60/805,505, filed on Jun. 22, 2006, provisional application No. 60/805,510, filed on Jun. 22, 2006.

(51) Int. Cl.
*B01D 61/48* (2006.01)
*C02F 1/469* (2006.01)

(52) U.S. Cl.
CPC ............. *C02F 1/4695* (2013.01); *B01D 61/48*
(2013.01); *B01D 61/485* (2013.01); *B01D 2313/30* (2013.01); *C02F 2201/46115* (2013.01)

(58) Field of Classification Search
USPC ........................................................ 204/632
See application file for complete search history.

(56) References Cited

U.S. PATENT DOCUMENTS

| 2,514,415 | A | 7/1950 | Rasch |
| 2,535,035 | A | 12/1950 | Briggs |
| 2,681,319 | A | 6/1954 | Bodamer |
| 2,681,320 | A | 6/1954 | Bodamer |

(Continued)

FOREIGN PATENT DOCUMENTS

| AU | 629790 A | 10/1992 |
| CA | 2316012 A1 | 2/2001 |

(Continued)

OTHER PUBLICATIONS

Oren, Yoran et al., "Studies on Polarity Reversal with Continuous Deionization," Desalination, Elsevier Scientific Publishing Co., Amsterdam, NL, vol. 86, No. 2, Jun. 1, 1992, pp. 155-171.

(Continued)

*Primary Examiner* — Arun S Phasge

(57) ABSTRACT

An electrochemical treating device having low scale potential is disclosed. The device has a variety of configurations directed to the layering of the anionic exchange and cationic exchange. The treatment device can also comprise unevenly sized ion exchange resin beads and/or have at least one compartment that provides a dominating resistance that results in a uniform current distribution throughout the apparatus.

5 Claims, 10 Drawing Sheets

(56) References Cited

U.S. PATENT DOCUMENTS

| | | |
|---|---|---|
| 2,689,826 A | 9/1954 | Kollsman |
| 2,777,814 A | 1/1957 | Latham |
| 2,788,319 A | 4/1957 | Pearson |
| 2,794,776 A | 6/1957 | Briggs |
| 2,794,777 A | 6/1957 | Pearson |
| 2,815,320 A | 12/1957 | Kollsman |
| 2,854,394 A | 9/1958 | Kollsman |
| 2,906,684 A | 9/1959 | Stoddard |
| 2,912,372 A | 11/1959 | Stoddard |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,091,583 A | 5/1963 | Schufle |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,216,920 A | 11/1965 | Nellen |
| 3,223,612 A | 12/1965 | Chen et al. |
| 3,291,713 A | 12/1966 | Parsi |
| 3,330,750 A | 7/1967 | McRae et al. |
| 3,341,441 A | 9/1967 | Giuffrida et al. |
| 3,375,182 A | 3/1968 | Chen |
| 3,375,208 A | 3/1968 | Duddy |
| 3,627,703 A | 12/1971 | Kojima et al. |
| 3,630,378 A | 12/1971 | Bauman |
| 3,639,231 A | 2/1972 | Bresler |
| 3,645,884 A | 2/1972 | Gilliland |
| 3,679,055 A | 7/1972 | Clark et al. |
| 3,686,089 A | 8/1972 | Korngold |
| 3,755,135 A | 8/1973 | Johnson |
| 3,786,924 A | 1/1974 | Huffman |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,162,218 A | 7/1979 | McCormick |
| 4,167,551 A | 9/1979 | Tamura et al. |
| 4,191,811 A | 3/1980 | Hodgdon |
| 4,197,206 A | 4/1980 | Karn |
| 4,202,772 A | 5/1980 | Goldstein |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,342,651 A | 8/1982 | Ahrens |
| 4,358,545 A | 11/1982 | Ezzell et al. |
| 4,359,789 A | 11/1982 | Roberts |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,569,747 A | 2/1986 | Kedem et al. |
| 4,574,049 A | 3/1986 | Pittner |
| 4,599,178 A | 7/1986 | Blytas |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,756 A | 9/1988 | Cawlfield et al. |
| 4,770,793 A | 9/1988 | Treffry-Goatley et al. |
| 4,775,480 A | 10/1988 | Milton et al. |
| 4,784,741 A | 11/1988 | Boulton et al. |
| 4,804,451 A | 2/1989 | Palmer |
| 4,806,244 A | 2/1989 | Guilhem |
| 4,808,287 A | 2/1989 | Hark |
| 4,830,721 A | 5/1989 | Bianchi et al. |
| 4,832,804 A | 5/1989 | Brattan |
| 4,849,102 A | 7/1989 | Latour et al. |
| 4,871,431 A | 10/1989 | Parsi |
| 4,872,888 A | 10/1989 | Ehrfeld et al. |
| 4,872,958 A | 10/1989 | Suzuki et al. |
| 4,880,511 A | 11/1989 | Sugita |
| 4,892,632 A | 1/1990 | Morris |
| 4,894,128 A | 1/1990 | Beaver |
| 4,898,653 A | 2/1990 | Morris |
| 4,915,803 A | 4/1990 | Morris |
| 4,925,541 A | 5/1990 | Giuffrida et al. |
| 4,931,160 A | 6/1990 | Giuffrida |
| 4,940,518 A | 7/1990 | Morris |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 4,999,107 A | 3/1991 | Guerif |
| 5,026,465 A | 6/1991 | Katz et al. |
| 5,030,672 A | 7/1991 | Hann et al. |
| 5,032,265 A | 7/1991 | Jha et al. |
| 5,059,330 A | 10/1991 | Burkhardt |
| 5,064,097 A | 11/1991 | Brog et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,107,896 A | 4/1992 | Otto |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,185,048 A | 2/1993 | Guerif |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,227,040 A | 7/1993 | Simons |
| 5,240,579 A | 8/1993 | Kedem |
| 5,244,579 A | 9/1993 | Horner et al. |
| 5,254,227 A | 10/1993 | Cawlfield et al. |
| 5,254,257 A | 10/1993 | Brigano et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,344,566 A | 9/1994 | Clancey |
| 5,346,624 A | 9/1994 | Libutti et al. |
| 5,346,924 A | 9/1994 | Giuffrida |
| 5,352,364 A | 10/1994 | Kruger et al. |

(56) References Cited

U.S. PATENT DOCUMENTS

| | | |
|---|---|---|
| 5,356,849 A | 10/1994 | Matviya et al. |
| 5,358,640 A | 10/1994 | Zeiher et al. |
| 5,364,439 A | 11/1994 | Gallup et al. |
| 5,376,253 A | 12/1994 | Rychen et al. |
| 5,397,445 A | 3/1995 | Umemura et al. |
| 5,411,641 A | 5/1995 | Trainham, III et al. |
| 5,415,786 A | 5/1995 | Martin et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,781 A | 10/1995 | Lin |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,538,746 A | 7/1996 | Levy |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,635,071 A | 6/1997 | Al-Samadi |
| 5,670,053 A | 9/1997 | Collentro et al. |
| 5,679,228 A | 10/1997 | Elyanow et al. |
| 5,679,229 A | 10/1997 | Goldstein et al. |
| 5,681,438 A | 10/1997 | Proulx |
| 5,714,521 A | 2/1998 | Kedem et al. |
| 5,716,531 A | 2/1998 | Kenley et al. |
| RE35,741 E | 3/1998 | Oren et al. |
| 5,733,602 A | 3/1998 | Hirose et al. |
| 5,736,023 A | 4/1998 | Gallagher et al. |
| 5,759,373 A | 6/1998 | Terada et al. |
| 5,762,421 A | 6/1998 | Ross |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,811,012 A | 9/1998 | Tanabe et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,868,937 A | 2/1999 | Back et al. |
| 5,891,328 A | 4/1999 | Goldstein |
| 5,925,240 A | 7/1999 | Wilkins et al. |
| 5,925,255 A | 7/1999 | Mukhopadhyay |
| 5,928,807 A | 7/1999 | Elias |
| 5,944,999 A | 8/1999 | Chancellor et al. |
| 5,954,935 A | 9/1999 | Neumeister et al. |
| 5,961,805 A | 10/1999 | Terada et al. |
| 5,980,716 A | 11/1999 | Horinouchi et al. |
| 6,017,433 A | 1/2000 | Mani |
| 6,030,535 A | 2/2000 | Hayashi et al. |
| 6,056,878 A | 5/2000 | Tessier et al. |
| 6,099,716 A | 8/2000 | Molter et al. |
| 6,103,125 A | 8/2000 | Kuepper |
| 6,113,797 A | 9/2000 | Al-Samadi |
| 6,123,823 A | 9/2000 | Mani |
| 6,126,805 A | 10/2000 | Batchelder et al. |
| 6,126,834 A | 10/2000 | Tonelli et al. |
| RE36,972 E | 11/2000 | Baker et al. |
| 6,146,524 A | 11/2000 | Story |
| 6,149,788 A | 11/2000 | Tessier et al. |
| 6,156,180 A | 12/2000 | Tessier et al. |
| 6,171,374 B1 | 1/2001 | Barton et al. |
| 6,183,643 B1 | 2/2001 | Goodley |
| 6,187,154 B1 | 2/2001 | Yamaguchi et al. |
| 6,187,162 B1 | 2/2001 | Mir |
| 6,187,201 B1 | 2/2001 | Abe et al. |
| 6,190,528 B1 | 2/2001 | Li et al. |
| 6,190,553 B1 | 2/2001 | Lee |
| 6,190,558 B1 | 2/2001 | Robbins |
| 6,193,869 B1 | 2/2001 | Towe et al. |
| 6,197,174 B1 * | 3/2001 | Barber et al. ............. 204/524 |
| 6,197,189 B1 | 3/2001 | Schwartz et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,241,893 B1 | 6/2001 | Levy |
| 6,248,226 B1 | 6/2001 | Shinmei et al. |
| 6,254,741 B1 | 7/2001 | Stuart et al. |
| 6,258,265 B1 | 7/2001 | Jones |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,279,019 B1 | 8/2001 | Oh et al. |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,309,532 B1 | 10/2001 | Tran et al. |
| 6,312,577 B1 | 11/2001 | Ganzi et al. |
| 6,315,886 B1 | 11/2001 | Zappi et al. |
| 6,334,955 B1 | 1/2002 | Kawashima et al. |
| 6,344,122 B1 | 2/2002 | Deguchi et al. |
| 6,365,023 B1 | 4/2002 | De Los Reyes et al. |
| 6,375,812 B1 | 4/2002 | Leonida |
| 6,379,518 B1 | 4/2002 | Osawa et al. |
| 6,391,178 B1 | 5/2002 | Garcia et al. |
| 6,398,965 B1 | 6/2002 | Arba et al. |
| 6,402,916 B1 | 6/2002 | Sampson et al. |
| 6,402,917 B1 | 6/2002 | Emery et al. |
| 6,402,920 B1 | 6/2002 | Sato et al. |
| 6,428,689 B1 | 8/2002 | Kameyama et al. |
| 6,458,257 B1 | 10/2002 | Andrews et al. |
| 6,461,512 B1 | 10/2002 | Hirayama et al. |
| 6,462,935 B1 | 10/2002 | Shiue et al. |
| 6,468,430 B1 | 10/2002 | Kimura et al. |
| 6,471,853 B1 | 10/2002 | Moscaritolo |
| 6,471,867 B2 | 10/2002 | Sugaya et al. |
| 6,482,304 B1 | 11/2002 | Emery et al. |
| 6,485,649 B1 | 11/2002 | Terava et al. |
| 6,495,014 B1 | 12/2002 | Datta et al. |
| 6,508,936 B1 | 1/2003 | Hassan |
| 6,514,398 B2 * | 2/2003 | DiMascio et al. ............ 204/533 |
| 6,537,436 B2 | 3/2003 | Schmidt et al. |
| 6,537,456 B2 | 3/2003 | Mukhopadhyay |
| 6,579,445 B2 | 6/2003 | Nachtman et al. |
| 6,607,647 B2 | 8/2003 | Wilkins et al. |
| 6,607,668 B2 | 8/2003 | Rela |
| 6,627,073 B2 | 9/2003 | Shimizu et al. |
| 6,645,383 B1 | 11/2003 | Lee et al. |
| 6,648,307 B2 | 11/2003 | Nelson et al. |
| 6,649,037 B2 | 11/2003 | Arba et al. |
| 6,651,383 B2 | 11/2003 | Grott |
| 6,726,822 B2 | 4/2004 | Garcia et al. |
| 6,730,227 B2 | 5/2004 | Zeiher et al. |
| 6,733,646 B2 | 5/2004 | Sato et al. |
| 6,766,812 B1 | 7/2004 | Gadini |
| 6,773,588 B2 | 8/2004 | Beeman et al. |
| 6,780,328 B1 | 8/2004 | Zhang |
| 6,783,666 B2 | 8/2004 | Takeda et al. |
| 6,795,298 B2 | 9/2004 | Shiue et al. |
| 6,808,608 B2 | 10/2004 | Srinivasan et al. |
| 6,824,662 B2 | 11/2004 | Liang et al. |
| 6,838,001 B2 | 1/2005 | Zeiher et al. |
| 6,896,814 B2 | 5/2005 | Chidambaran et al. |
| 6,908,546 B2 | 6/2005 | Smith |
| 6,929,748 B2 | 8/2005 | Avijit et al. |
| 6,998,053 B2 | 2/2006 | Awerbuch |
| 7,083,730 B2 | 8/2006 | Davis |
| 7,083,733 B2 | 8/2006 | Freydina et al. |
| 7,122,149 B2 | 10/2006 | Li et al. |

(56) References Cited

U.S. PATENT DOCUMENTS

| | | |
|---|---|---|
| 7,144,511 B2 | 12/2006 | Vuong |
| 7,147,785 B2 | 12/2006 | Arba et al. |
| 7,264,737 B2 | 9/2007 | Godec et al. |
| 7,306,724 B2 | 12/2007 | Gordon |
| 7,329,358 B2 | 2/2008 | Wilkins et al. |
| 7,459,088 B2 | 12/2008 | Davis |
| 7,470,366 B2 | 12/2008 | Queen et al. |
| 7,501,064 B2 | 3/2009 | Schmidt et al. |
| 7,563,351 B2 | 7/2009 | Wilkins et al. |
| 7,582,198 B2 | 9/2009 | Wilkins et al. |
| 7,604,725 B2 | 10/2009 | Ganzi et al. |
| 7,807,032 B2 | 10/2010 | Yan et al. |
| 7,846,340 B2 | 12/2010 | Freydina et al. |
| 7,862,700 B2 | 1/2011 | Wilkins et al. |
| 8,066,860 B2 | 11/2011 | Barber et al. |
| 8,168,055 B2 | 5/2012 | Barber et al. |
| 8,241,478 B2 | 8/2012 | Barber et al. |
| 2001/0003329 A1 | 6/2001 | Sugaya et al. |
| 2001/0037942 A1 | 11/2001 | Schmidt et al. |
| 2002/0011413 A1 | 1/2002 | DiMascio et al. |
| 2002/0020626 A1 | 2/2002 | Sato |
| 2002/0092769 A1 | 7/2002 | Garcia et al. |
| 2002/0103724 A1 | 8/2002 | Huxter |
| 2002/0104804 A1 | 8/2002 | Grott |
| 2002/0125137 A1 | 9/2002 | Sato et al. |
| 2002/0139676 A1 | 10/2002 | Moulin et al. |
| 2002/0144948 A1 | 10/2002 | Aimar et al. |
| 2002/0144954 A1 | 10/2002 | Arba et al. |
| 2002/0189951 A1 | 12/2002 | Liang et al. |
| 2003/0034292 A1 | 2/2003 | Rela |
| 2003/0038089 A1 | 2/2003 | Levy |
| 2003/0059663 A1 | 3/2003 | Misumi |
| 2003/0079992 A1 | 5/2003 | Wilkins et al. |
| 2003/0079993 A1 | 5/2003 | Miwa et al. |
| 2003/0080467 A1 | 5/2003 | Andrews et al. |
| 2003/0089609 A1 | 5/2003 | Liang et al. |
| 2003/0098266 A1 | 5/2003 | Shiue et al. |
| 2003/0106845 A1 | 6/2003 | Bernard et al. |
| 2003/0150732 A1 | 8/2003 | Yamanaka et al. |
| 2003/0155243 A1 | 8/2003 | Sferrazza |
| 2003/0188352 P1 | 10/2003 | Byrne et al. |
| 2003/0201235 A1 | 10/2003 | Chidambaran et al. |
| 2003/0205526 A1 | 11/2003 | Vuong |
| 2003/0213695 A1 | 11/2003 | Yamanaka et al. |
| 2004/0035802 A1 | 2/2004 | Emery et al. |
| 2004/0055955 A1 | 3/2004 | Davis |
| 2004/0060823 A1 | 4/2004 | Carson et al. |
| 2004/0079700 A1 | 4/2004 | Wood et al. |
| 2004/0089551 A1 | 5/2004 | Liang et al. |
| 2004/0118780 A1 | 6/2004 | Willman et al. |
| 2004/0173535 A1 | 9/2004 | Li |
| 2004/0178075 A1 | 9/2004 | Sato |
| 2004/0206627 A1 | 10/2004 | Bejtlich et al. |
| 2005/0016922 A1 | 1/2005 | Enzweiler et al. |
| 2005/0016932 A1 | 1/2005 | Arba et al. |
| 2005/0040115 A1 | 2/2005 | Reinhard |
| 2005/0098436 A1 | 5/2005 | Miwa et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103717 A1 | 5/2005 | Jha et al. |
| 2005/0103722 A1 | 5/2005 | Freydina et al. |
| 2005/0103723 A1 | 5/2005 | Wilkins et al. |
| 2005/0103724 A1 | 5/2005 | Wilkins et al. |
| 2005/0109703 A1 | 5/2005 | Newenhizen |
| 2005/0121388 A1 | 6/2005 | Wood et al. |
| 2005/0210745 A1 | 9/2005 | Grott |
| 2005/0217995 A1 | 10/2005 | Reinhard |
| 2005/0247631 A1 | 11/2005 | Queen et al. |
| 2005/0263457 A1 | 12/2005 | Wilkins et al. |
| 2006/0027457 A1 | 2/2006 | Sato |
| 2006/0037862 A1 | 2/2006 | Miwa et al. |
| 2006/0042957 A1 | 3/2006 | He |
| 2006/0060532 A1 | 3/2006 | Davis |
| 2006/0091013 A1 | 5/2006 | Takahashi et al. |
| 2006/0091077 A1 | 5/2006 | Haas et al. |
| 2006/0144787 A1 | 7/2006 | Schmidt et al. |
| 2006/0157422 A1 | 7/2006 | Freydina et al. |
| 2006/0163056 A1 | 7/2006 | Grebenyuk et al. |
| 2006/0169580 A1 | 8/2006 | Grebenyuk et al. |
| 2006/0169581 A1 | 8/2006 | Grebenyuk et al. |
| 2006/0231403 A1 | 10/2006 | Riviello |
| 2006/0231404 A1 | 10/2006 | Riviello |
| 2006/0231406 A1 | 10/2006 | Freydina et al. |
| 2006/0231495 A1 | 10/2006 | Freydina et al. |
| 2006/0254919 A1 | 11/2006 | Jangbarwala |
| 2006/0266651 A1 | 11/2006 | Iwasaki |
| 2006/0291839 A1 | 12/2006 | Zoccolante et al. |
| 2007/0045196 A1 | 3/2007 | Kawaguchi et al. |
| 2007/0278099 A1 | 12/2007 | Barber |
| 2007/0284251 A1 | 12/2007 | Zuback et al. |
| 2007/0284252 A1 | 12/2007 | Ganzi et al. |
| 2007/0295604 A1 | 12/2007 | Freydina |
| 2008/0067069 A1 | 3/2008 | Gifford et al. |
| 2008/0067125 A1 | 3/2008 | Wilkins et al. |
| 2008/0073215 A1 | 3/2008 | Barber et al. |

FOREIGN PATENT DOCUMENTS

| | | |
|---|---|---|
| CN | 1044411 A | 8/1990 |
| DE | 1201055 B | 9/1965 |
| DE | 2708240 A1 | 8/1978 |
| DE | 3238280 A1 | 4/1984 |
| DE | 4003812 A1 | 8/1990 |
| DE | 4016000 A1 | 11/1991 |
| DE | 4238532 A1 | 5/1994 |
| DE | 4418812 A1 | 12/1995 |
| DE | 19942347 A1 | 3/2001 |
| EP | 0170895 B1 | 3/1989 |
| EP | 0417506 A1 | 3/1991 |
| EP | 0462606 A1 | 12/1991 |
| EP | 0503589 A1 | 9/1992 |
| EP | 0621072 A2 | 10/1994 |
| EP | 0680932 A2 | 11/1995 |
| EP | 0797529 A1 | 10/1997 |
| EP | 0803474 A2 | 10/1997 |
| EP | 0870533 A1 | 10/1998 |
| EP | 1068901 A2 | 1/2001 |
| EP | 1075868 A2 | 2/2001 |
| EP | 1101790 A1 | 5/2001 |
| EP | 1106241 A1 | 6/2001 |
| EP | 1129765 A1 | 9/2001 |
| EP | 1172145 A2 | 1/2002 |
| EP | 1222954 A1 | 7/2002 |
| EP | 1308201 A1 | 5/2003 |
| EP | 1388595 A1 | 2/2004 |
| EP | 1506941 A1 | 2/2005 |
| EP | 1762546 A1 | 3/2007 |
| FR | 2818267 A1 | 6/2002 |
| GB | 776469 A | 6/1957 |
| GB | 876707 A | 9/1961 |
| GB | 877239 A | 9/1961 |
| GB | 880344 A | 10/1961 |
| GB | 893051 A | 4/1962 |
| GB | 942762 A | 11/1963 |
| GB | 1048026 A | 11/1966 |
| GB | 1137679 A | 12/1968 |
| GB | 1318036 A | 5/1973 |
| GB | 1381681 A | 1/1975 |
| GB | 1448533 A | 9/1976 |
| GB | 2278069 A | 11/1994 |
| GB | 2303802 A | 3/1997 |
| GB | 2403166 A | 12/2004 |
| JP | 52-047580 A | 4/1977 |
| JP | 54-5888 | 1/1979 |
| JP | 63-036893 A | 2/1988 |
| JP | 02307514 A | 12/1990 |
| JP | 03-207487 A | 9/1991 |
| JP | 04-071624 A | 3/1992 |
| JP | 05271015 A | 10/1993 |
| JP | 06-000339 A | 1/1994 |
| JP | 06030535 A | 2/1994 |
| JP | 07-155750 A | 6/1995 |

(56) References Cited

FOREIGN PATENT DOCUMENTS

| | | |
|---|---|---|
| JP | 07-265865 A | 10/1995 |
| JP | 08-150326 A | 6/1996 |
| JP | 09-253643 A | 9/1997 |
| JP | H10500617 A | 1/1998 |
| JP | 11-42483 A | 2/1999 |
| JP | 2000126767 A | 5/2000 |
| JP | 2001-79358 | 3/2001 |
| JP | 2001-79553 | 3/2001 |
| JP | 2001-104960 A | 4/2001 |
| JP | 2001-113137 A | 4/2001 |
| JP | 2001-113279 A | 4/2001 |
| JP | 2001-113280 A | 4/2001 |
| JP | 2001-121152 A | 5/2001 |
| JP | 2002001070 A | 1/2002 |
| JP | 2002126744 A | 5/2002 |
| JP | 2002-205071 A | 7/2002 |
| JP | 2003094064 A | 4/2003 |
| JP | 2003-190820 A | 7/2003 |
| JP | 2004-358440 A | 12/2004 |
| JP | 2005007347 A | 1/2005 |
| JP | 2005007348 A | 1/2005 |
| JP | 2005-508729 A | 4/2005 |
| RO | 114874 B1 | 8/1999 |
| RU | 216622 | 11/1972 |
| RU | 990256 | 1/1983 |
| RU | 2004137231 A | 6/2006 |
| RU | 2281255 C1 | 8/2006 |
| SU | 1118389 | 10/1984 |
| WO | 9203202 A2 | 3/1992 |
| WO | 9211089 A1 | 7/1992 |
| WO | 9532052 A1 | 11/1995 |
| WO | 9532791 A1 | 12/1995 |
| WO | 9618550 A1 | 6/1996 |
| WO | 9622162 A1 | 7/1996 |
| WO | 9725147 A1 | 7/1997 |
| WO | 9746491 A1 | 12/1997 |
| WO | 9746492 A1 | 12/1997 |
| WO | 9811987 A1 | 3/1998 |
| WO | 9817590 A1 | 4/1998 |
| WO | 9820972 A1 | 5/1998 |
| WO | 9858727 A1 | 12/1998 |
| WO | 9939810 A1 | 8/1999 |
| WO | 9951529 A1 | 10/1999 |
| WO | 0030749 A1 | 6/2000 |
| WO | 0044477 A1 | 8/2000 |
| WO | 0064325 A2 | 11/2000 |
| WO | 0075082 A1 | 12/2000 |
| WO | 0130229 A1 | 5/2001 |
| WO | 0149397 A1 | 7/2001 |
| WO | 0204357 A1 | 1/2002 |
| WO | 0214224 A1 | 2/2002 |
| WO | 0226629 A2 | 4/2002 |
| WO | 02096807 A2 | 12/2002 |
| WO | 03033122 A2 | 4/2003 |
| WO | 03040042 A1 | 5/2003 |
| WO | 03053859 A1 | 7/2003 |
| WO | 03072229 A1 | 9/2003 |
| WO | 03086590 A1 | 10/2003 |
| WO | 2004013048 A2 | 2/2004 |
| WO | 2004024992 A1 | 3/2004 |
| WO | 2004106243 A1 | 12/2004 |
| WO | 2004112943 A1 | 12/2004 |
| WO | 2005044427 A1 | 5/2005 |
| WO | 2005087669 A1 | 9/2005 |
| WO | 2005106100 A1 | 11/2005 |
| WO | 2005113120 A1 | 12/2005 |
| WO | 2006031732 A2 | 3/2006 |
| WO | 2006110860 A1 | 10/2006 |
| WO | 2007145785 A1 | 12/2007 |
| WO | 2007145786 A1 | 12/2007 |
| WO | 2008131085 A1 | 10/2008 |

OTHER PUBLICATIONS

Osmonics® Hot-Water Sanitizable RO Systems, Specifications, pp. 1-2. Copyright 2000 Osonics, Inc. www.osmonics.com <http://www.osmonics.com>.

Peterson, R.J. et al., Temperature-Resistant Elements for Reverse Osmosis Treatment of Hot Process Waters, Published Dec. 1983, Filmtec Corporation, Minneapolis, Minnesota 55435. Prepared for the U.S. Departmen of Energy, Under DOE Contract No. DE-FC07-82ID12423 (DOE/ID/12423-TI—DE84005190), pp. 1-69.

Pourcelly, Gerald, Conductivity and selectivity of ion exchange membranes: structure-correlations, Desalination, vol. 147 (2002) pp. 359-361.

Public Health and the Environment World Health Organization, "Desalination for Safe Water Supply, Guidance for the Health and Environmental Aspects Applicable to Desalination," Geneva 2007.

Purolite Technical Bulletin, Hypersol-Macronet™ Sorbent Resins, 1995.

Reverse Osmosis Membrane Elements—131 Duratherm®, pp. 1-2, www.osmonics.com <http://www.osmonics.com> Aug. 2002.

Simons, "Strong Electric Field Effects on Proton Transfer Between Membrane-Bound Amines and Water," Nature, vol. 280, Aug. 30, 1979, pp. 824-826.

Simons, R., "Electric Field Effects on Proton Transfer Between Ionizable Groups and Water in Ion Exchange Membranes," Electrochimica Acta, vol. 29, No. 2, 1984, pp. 151-158.

Simons, R., "The Origin and Elimination of Water Splitting in Ion Exchange Membranes During Water Demineralisation by Electrodialysis," Desalination, vol. 28, Jan. 29, 1979, pp. 41-42.

Simons, R., "Water Splitting in Ion Exchange Membranes," Pergamon Press Ltd., 1985, pp. 275-282.

Sirivedhin, "Reclaiming produced water for beneficial use: salt removal by electrodialysis," Journal of Membrane Science (2004), vol. 243, pp. 335-343.

Su et al., "Rejection of ions by NF membranes for binary electrolyte solutions of NaCl, NaNO3, CaCl2 and Ca(NO3)2," Desalination (2006) vol. 191, pp. 303-308.

Thanuttamavong et al., "Rejection characteristics of organic and inorganic pollutants by ultra low-pressure nanofiltration of surface water for drinking water treatment," Desalination (2002) vol. 145, pp. 257-264.

Tseng, Tai, et al., "Optimization of Dual-Staged Nanofiltration Membranes for Seawater Desalination"; American Water Works Association 2003 CA-NC Annual Fall Conference; Oct. 7, 2003.

U.S. Bureau of Reclamation, Sandia National Laboratories, "Desalination and Water Purification Technology Roadmap-A Report of the Executive Committee," Jan. 2003.

U.S. Congress, Office of the Technology Assessment, "Using Desalination Technologies for Water Treatment," OTA-BP-O-46 (Washington, D.C.: U.S. Government Printing Office), Mar. 1988.

U.S.P. Requirements for Water for Injection, pp. 1752-1753, 1927-1929. Aug. 2002.

USFilter, "CDI-LX™ Systems," product information, 2001, 6 pages, Mar. 2001.

USFilter, "H-Series Industrial CDI® Systems," product information, 1998, 4 pgs.

V. Shaposhnik et al., "Demineralization of water by electrodialysis with ion-exchange membranes, grains and nets," Desalination, vol. 133, (2001), pp. 211-214.

Veolia Water Implement Hybrid Desalination Solution in New Contract With Fujairah, 1 page, Water Online, Aug. 29, 2007.

Von Gottberg et al., "Optimizing Water Recovery and Energy Consumption for Seawater RO Systems," Water & Process Technologies, General Electric Technical Paper (2005).

Walters et al., "Concentration of Radioactive Aqueous Wastes," Industrial and Engineering Chemistry, Jan. 1955, pp. 61-67.

Wang et al., "A Study of the electrodeionization process-high-purity water production with a RO/EDI system," Desalination, vol. 132, pp. 349-352, Oct. 3, 2000.

Warshawsky et al., "Thermally Regenerable Polymerable Polymeric Crown Ethers, II Synthesis and Application in Electrodialysis," pp. 579-584, publication and date unknown.

Watson, "The Basics of Seawater Desalting by Reverse Osmosis," Water & Wastes Digest, pp. 16-19, Jan. 2007.

(56) References Cited

OTHER PUBLICATIONS

Weitnauer, Angela et al., Reverse Osmosis for WFI and PW, Published in: Ultrapure Water, Date: Mar. 1, 1996. pp. 1-6. www.osmonics.com <http://www.osmonics.com>.
Wise et al, "Hot Water Sanitization & RO: A Plain and Simple Introduction", Presented at: Water Conditioning & Purification Magazine; Date Presented: Feb. 1, 2002. OSMONICS®, pp. 1-6. www.osmonics.com <http://www.osmonics.com>.
Wise, Brian, Chemical Processing, Turning Up the Heat, Hot Water Sanitation Membranes Tackle Microbes in RO Permeate Water, pp. 1-6. Aug. 2002.
Wood et al., The Use of Hot Water for Sanitization of RO Membranes in Ultrapure Water Systems, U.S. Filter/Ionpure, Inc., Lowell, MA, USA. Oct. 25, 1995. Presented at the 1997 Fifteenth Annual Membrane Technology/ Separations Planning Conference, sponsored by Business Communications Co., Inc., Newton, MA, Oct. 29, 1997, pp. 1-10.
Wood, Hot Water Sanitization of Continuous Electrodeionization Systems, Pharmaceutical Engineering, vol. 20, No. 6, Nov./Dec. 2000, pp. 1-15.
Wood, J.H. et al., "Continuous Electrodeionisation: Module Design Considerations for the Production of High Purity Water," Proc. of IEX at the Millenium, Jul. 16, 2000, pp. 44-51.
World Bank, "Seawater and Brackish Water Desalination in the Middle East, North Africa and Central Asia," A Review of Key Issues and Experience in Six Countries Final Report, Main Report, Dec. 2004.
World Health Organization, Guidelines for Drinking-Water Quality; Chemical Facts Sheet pp. 296-461 (2003).
www.wateronline.com/content/news/article.asp <http://www.wateronline.com/content/news/article.asp> Microfiltration and Ultrafiltration Hold Huge Potential for the Desalination Pretreatment Market, Nov. 14, 2006.
"Affordable Desalination Sets Low Energy Record," press release, http://www.affordableseal.com/home/news/ADC%20Sets%20Low%20Energy%205-8-06.pdf, May 4, 2006, printed on Apr. 16, 2008.
"Desalting Handbook for Planners", Desalination and Water Purification Research and Development Program, Report No. 72, 3rd Edition, Jul. 2003, pp. 1-233.
"Guidelines for the Safe Use of Wastewater, Excreta and Greywater", World Health Organization, vol. 2, Wastewater Use in agriculture, pp. 1-196, undated.
"Preliminary Research Study for the Construction of a Pilot Cogeneration Desalination Plant in Southern California," Water Treatment Technology Program Report No. 7, U.S. Department of the Interior May, 1995.
"Salt Content in Irrigation Water," Lenntech, pp. 1-5, undated.
"SAR Hazard of Irrigation," Lenntech, pp. 1-4, undated.
"Using Desalination Technologies for Water Treatment", Mar. 1988 NTIS Order #PB88-193354.
"Zeta Potential," Lenntech, pp. 1-3, undated.
Almulla et al., "Developments in high recovery brackish water desalination plants as part of the solution to water quantity problems," Desalination 153 (2002) pp. 237-243.
ASTM, "Standard Practice for Calculation and Adjustment of the Langelier Saturation Index for Reverse Osmosis," Designation: D3739-94 (Reapproved 1998), pp. 1-4.
Bhongsuwan et al., "Development of Cellulose Acetate Membranes for Nano- and Reverse-Osmosis Filtration of Contaminants in Drinking Water," Jurnal Teknologi, 41(F) Keluaran Khas. Dis. 2004, pp. 89-100.
Buros "The ABCs of Desalting". Second Edition, published by the International Desalination Association, Topsfield, MA U.S.A. 2000.
Busch et al., "Reducing energy consumption in seawater desalination," Desalination 165 (2004) 299-312.
Calay et al. "The Use of EDI to Reduce the Ammonia Concentration in Steam Generators Blowdown of PWR Nuclear Power Plants". PowerPlant Chemistry, vol. 2, No. 8. (2000). pp. 467-470.
Chemical Processing, Family of High Temperature RO Membrane Elements, Product News, p. 1. Aug. 15, 2002.
Cowan et al. "Effect of Turbulence on Limiting Current in Electrodialysis Cells". Industrial and Engineering Chemistry, vol. 51, No. 12 pp. 1445-1448. Dec. 1959.
Côte et al, "Use of Ultrafiltration for Water Reuse and Desalination," The ZEEWEED® Ultrafiltration Membrane.
Côte, et al, "A new immersed membrane for pretreatment to reverse osmosis," Desalination 139 (2001) 229-236.
Del Pino et al., "Wastewater reuse through dual-membrane processes: opportunities for sustainable water resources," Desalination (1999) vol. 124, pp. 271-277.
Desalination Post-Treatment: Boron Removal Process, Lenntech.com (1998-2008), 4 pages.
Dimascio et al. "Continuous Electrodeionization: Production of High-Purity Water without Regeneration Chemicals". The Electrochemical Society Interface, Fall 1998. pp. 26-29.
Dimascio et al. Electrodiaresis Polishing (An Electrochemical Deionization Process) 1994, pp. 164-172.
Dow Chemical, "DOWEX Marathon A Ion Exchange Resin," published Dec. 1999, Product Literature reprinted from www.dow.com.
Dow Chemical, "DOWEX Marathon A2 Ion Exchange Resin," published Nov. 1998, Product Literature reprinted from www.dow.com.
DUPONT Nafion PFSA Products, Technical Information, "Safe Handling and Use and Perfluorosulfonic Acid Products". Nov. 1993, 4 pages.
DUPONT Nation PFSA Products, Technical Information, "Safe Handling and Use of Perfluorosulfonic Acid Products," Feb. 2004. 4 pages.
Farmer et al. "Capacitive Deionization of $NH_4ClO_4$ Solutions with Carbon Aerogel Electrodes". Journal of Applied Electrochemistry, 26:1007-1018 (1996).
FDA "Guide to Inspections of High Purity Water Systems". Jul. 1993, printed from www.fda.gov on Mar. 30, 2004.
Frost & Sullivan, "Microfiltration and Ultrafiltration Hold Huge Potential for the Desalination Pretreatment Market," published Nov. 14, 2006, Water Online.
Ganzi et al. "Electrodeionization: Theory and Practice of Continuous Electrodeionization". Ultrapure Water, Jul./Aug. 1997. pp. 64-69.
Ganzi, "Electrodeionization for High Purity Water Production," AIChE Symposium Series, Membrane Materials and Processes, pp. 73-83.
Gifford et al., "An Innovative Approach to Continuous Electrodeionization Module and System Design for Power Applications," Official Proceedings of the 61st Annual Meeting IWC 2000, Oct. 22-26, 2000, Pittsburgh, PA, Paper No. 0052, pp. 479-485.
Gittens, G.J. et al., "The Application of Electrodialysis to Demineralisation," A.I.Ch.E.-I.Chem.E. Symposium Series No. 9, 1965 (London: Instn chem. Engrs), pp. 79-83.
Glueckauf, "Electro-Deionisation Through a Packed Bed," British Chemical Engineering, Dec. 1959, pp. 646-651.
Hell et al., "Experience with full-scale electrodialysis for nitrate and hardness removal," Desalination, (1998) vol. 117, pp. 173-180.
Hobro et al., "Recycling of Chromium from Metal Finishing Waste Waters Using Electrochemical Ion Exchange (EIX)," 1994, pp. 173-183, publication and date unknown.
Hyung et al., "A mechanistic study on boron rejection by sea water reverse osmosis membranes," Journal of Membrane Science (2006) vol. 286, pp. 269-278.
Jha, Anil D. et al., "CEDI: Selecting the Appropriate Configuration," reprinted from Power Engineering, Aug. 2000 edition.
Johnson et al., "Desalting by Means of Porous Carbon Electrodes," Electrochemical Technology, vol. 118, No. 3, Mar. 1971, pp. 510-517.
Judson King, C., et al., "Separation Technology in Japan"; Japanese Technology Evaluation Center; International Tech. Research Institute, Loyola College in Maryland, pp. 1-43, Mar. 1993.
Kedem et al., "EDS—Sealed Cell Electrodialysis," Desalination, vol. 46, 1983, pp. 291-299.

(56) References Cited

OTHER PUBLICATIONS

Kedem et al., "Reduction of Polarization by Ion-Conduction Spacers: Theoretical Evaluation of a Model System," Desalination, vol. 27, 1978, pp. 143-156.

Korngold, "Electrodialysis Process Using Ion Exchange Resins Between Membranes," Desalination, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, UniversitéMontpellier II, Science Et Technique Du Languedoc, Jul. 17, 1998.

Larchet et al., "Application of electromembrane technology for providing drinking water for the population of the Aral region," Desalination (2002), vol. 149, pp. 383-387.

Matejka, "Continuous Production of High-Purity Water by Electro-Deionisation," J. Appl. Chem., Biotechnol., vol. 21, Apr. 1971, pp. 117-120.

Mohammad et al., "Predicting flux and rejection of multicomponent salts mixture in nanofiltration membranes," Desalination 157 (2003) 105-111.

Nesicolaci, M., "Reverse Osmosis is Taking Global Water & Wastewater Treatment by Storm," Water Purification Solutions, Severn Trent Services, undated.

Ganzi, G. C., "Electrodeionization for high-purity water production" AIChE Symposium Series, No. 261, vol. 84, New Membrane Materials and Processes for Separation, edited by Sirkar, K. K. and Lloyd, pp. 73-83, 1988.

\* cited by examiner

LOW SCALE POTENTIAL WATER TREATMENT

CROSS-REFERENCE TO RELATED APPLICATIONS

This application is a continuation application of U.S. patent application Ser. No. 11/767,438, filed Jun. 22, 2007, titled "LOW SCALE POTENTIAL WATER TREATMENT," which claims the benefit of U.S. Provisional Patent Application Ser. No. 60/805,505, filed on Jun. 22, 2006, titled "ENHANCED HARDNESS TOLERANCE OF CEDI MODULES," U.S. Provisional Patent Application Ser. No. 60/805,510, also filed on Jun. 22, 2006, titled "METHODS TO REDUCE SCALING IN EDI DEVICES," and U.S. Provisional Patent application Ser. No. 60/912,548, filed on Apr. 18, 2007, titled "USE OF INERT RESIN IN THE CONCENTRATE COMPARTMENT TO IMPROVE CURRENT DISTRIBUTION FOR EDI MODULES," each of which is incorporated herein by reference in their entirety for all purposes.

BACKGROUND OF INVENTION

1. Field of Invention

This invention relates to systems and methods of water treatment having a low potential for scale formation and, in particular, to reducing the potential for scale formation in systems that utilize electrically-motivated separation apparatus.

2. Discussion of Related Art

Electrically-motivated separation apparatus including, but not limited to, electrodialysis as well as electrodeionization devices, have been used to treat water. For example, Liang et al., in U.S. Pat. No. 6,649,037, disclose an electrodeionization apparatus and method for purifying a fluid by removing the ionizable species.

SUMMARY OF THE INVENTION

One or more aspects of the invention relate to an electrodeionization apparatus having an anode compartment and a cathode compartment. The electrodeionization apparatus comprises a first depleting compartment disposed between the anode compartment and the cathode compartment, a concentrating compartment in ionic communication with the depleting compartment, a second depleting compartment in ionic communication with the concentrating compartment, and a first barrier cell in ionic communication with and disposed between the first depleting compartment and at least one of the anode compartment and the cathode compartment.

Other aspects of the invention relate to an electrodeionization apparatus comprising a depleting compartment and a first concentrating compartment in ionic communication with the depleting compartment, and defined at least partially by an anion selective membrane and a cation selective membrane. The first concentrating compartment typically contains, at least partially, a first zone comprising substantially of cation exchange media that is substantially separated from the anion selective membrane by a second zone comprising substantially of anion exchange media.

Still other aspects of the invention relate to an electrodeionization apparatus comprising a depleting compartment, a first concentrating compartment in ionic communication with the depleting compartment, and a second concentrating compartment in ionic communication with the depleting compartment. The first concentrating compartment typically comprises media with a first effective current resistance and the second concentrating compartment having a portion thereof comprising media with a second effective current resistance greater than the first effective current resistance.

Still other aspects of the invention relate to an electrodeionization apparatus comprising a depleting compartment, and a concentrating compartment in ionic communication with the depleting compartment. The concentrating compartment typically comprises a mixture of anion exchange resin and cation exchange resin and amounts of the anion exchange resin and cation exchange resin in the mixture varies relative to a flow path length of the concentrating compartment.

Still other aspects of the invention relate to an electrodeionization apparatus having at least one compartment with at least one outlet port defined by a distributor having a plurality of apertures. The electrodeionization apparatus can comprise a first layer of particles in the compartment bounded by ion selective membranes. The particles can comprise media having a first effective diameter less than the smallest dimension of the apertures. The electrodeionization apparatus further comprises a second layer of particles in the compartment downstream of the first layer. The second layer of particles typically has a second effective diameter greater than the first effective diameter and greater than the smallest dimension of the apertures.

Still further aspects of the invention relate to electrodeionization system comprising a source of water to be treated, a treating module comprising a depleting compartment and a concentrating compartment, the treating module fluidly connected to the source of water to be treated; an electrolytic module comprising an acid-generating compartment, and a source of a brine solution fluidly connected to an inlet of the acid-generating compartment of the electrolytic module. The electrolytic module is fluidly connected upstream of the concentrating compartment.

Aspects of the invention relate to an electrodeionization apparatus comprising a compartment containing a mixture of anion exchange resins and cation exchange resins. The anion exchange resins having an average diameter at least 1.3 times greater than an average diameter of the cation exchange resins.

Aspects of the invention relate to an electrodeionization apparatus comprising a compartment containing a mixture of anion exchange resins and cation exchange resins. The cation exchange resins having an average diameter at least 1.3 times greater than an average diameter of the anion exchange resins.

Still other aspects of the invention relate to a water treatment system comprising a source of water to be treated, an electrodeionization device comprising a plurality of concentrating and depleting compartments and fluidly connected to the source of water to be treated, a chiller in thermal communication with the water to be introduced into at least one concentrating compartment of the electrodeionization device, a sensor disposed to provide a representation of a temperature of at least one of water to be introduced into the concentrating compartment and water exiting the concentrating compartment, and a controller configured to receive the temperature representation and generate a signal that promotes cooling the water to be introduced into the concentrating compartment.

Still other aspects of the invention relate to electrodeionization apparatus comprising a depleting compartment at least partially defined by a cation selective membrane and an anion selective membrane, and a concentrating compartment at least partially defined by the anion selective membrane and containing a first layer of anion exchange media and a second layer of media disposed downstream of the first layer, the second layer comprising anion exchange media and cation exchange media.

Still other aspects of the invention relate to a method of treating water in an electrodeionization device having a depleting compartment and a concentrating compartment. The method comprising measuring one of a temperature of a stream in the concentrating compartment, a temperature of a stream to be introduced into the concentrating compartment, and a temperature of a stream exiting from the concentrating compartment; reducing the temperature of the water to be introduced into the concentrating compartment to a predetermined temperature; introducing water to be treated into the depleting compartment; and removing at least a portion of at least one undesirable species from the water to be treated in the electrodeionization device.

Still other aspects of the invention relate to a method of treating water in an electrodeionization device comprising introducing water having anionic and cationic species into a depleting compartment of the electrodeionization device, promoting transport of at least a portion of the cationic species into a first barrier cell disposed between the depleting compartment and a cathode compartment of the electrodeionization device, and promoting transport of at least a portion of the anionic species into a second barrier cell disposed between the depleting compartment and an anode compartment of the electrodeionization device.

Still other aspects of the invention relate to a method of treating water in an electrodeionization device having a depleting compartment and a concentrating compartment. The method comprises introducing water to be treated into the depleting compartment of the electrodeionization device, promoting transport of an undesirable species from the depleting compartment into the concentrating compartment of the electrodeionization device. The concentrating compartment can typically contains a first layer of anion exchange media and a second layer of media disposed downstream of the first layer and the second layer can comprise a mixture of anion exchange media and cation exchange media.

Still other aspects of the invention relate to a method of treating water comprising introducing water to be treated into a depleting compartment of an electrodeionization device, the depleting compartment having at least one layer of ion exchange media; and promoting transport of at least a portion of anionic species from the water introduced into the depleting compartment from a first layer of ion exchange media into a first concentrating compartment to produce water having a first intermediate quality. The first concentrating compartment is defined, at least partially, by an anion selective membrane and a cation selective membrane. The first concentrating compartment contains, at least partially, a first zone comprising cation exchange media that is substantially separated from the anion selective membrane by a second zone comprising anion exchange media.

Still other aspects of the invention relate to a method of treating water in an electrodeionization device. The method comprises introducing water to be treated comprising undesirable species into a depleting compartment of the electrodeionization device, promoting transport of the undesirable species from the depleting compartment to a concentrating compartment of the electrodeionization device to produce the treated water; electrolytically generating an acid solution in the ancillary module, and introducing at least a portion of the acid solution into the concentrating compartment.

Further aspects of the invention relate to a water treatment system comprising a source of a water to be treated, and an electrodeionization device comprising a first depleting compartment and a second depleting compartment, each of the first and second depleting compartment fluidly connected to the source of water to be treated in a parallel flow configuration; and a first concentrating compartment in ionic communication with the first depleting compartment and a second concentrating compartment fluidly connected to downstream of the first concentrating compartment.

Other aspects of the invention relate electrodeionization apparatus comprising a plurality of depleting compartments configured to have liquid flowing therein along parallel flow paths, and a plurality of concentrating compartments in ionic communication with at least one depleting compartment, wherein at least portion of the concentrating compartments are arranged serially.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings:

FIGS. 9A and 9B are schematic illustrations of concentrating and depleting compartment cell pairs in an electrodeionization device wherein FIG. 9A shows compartments thereof comprising layers of media and FIG. 9B shows compartments thereof comprising layers and zones of media in accordance with one or more embodiments of the invention.

DETAILED DESCRIPTION

The invention provides electrically-driven separation apparatuses such as but not limited to filled compartment electrodeionization (CEDI) devices such as those disclosed in U.S. Pat. Nos. 4,632,745, 6,649,037, 6,824,662, and 7,083,733, each of which is incorporated herein by reference. In particular, the embodiments implementing one or more aspects of the invention provide can be, in some cases, characterized as having a lower potential or a lower likelihood of forming scale. Although the various aspects of the invention are presented through embodiments involving electrodeionization devices, such various aspects of the invention may be practiced in other electrically-driven or motivated separation apparatus that can facilitate treatment of a fluid having at least one undesirable species. Particularly pertinent aspects of the invention can involve electrodeionization apparatus utilized to treat or remove at least one dissolved species from a water stream or a body of water. Thus, the various aspects of the invention can advantageously provide electrodeionization apparatuses that are configured or operated to treat water having high scale potential.

Figure 1:
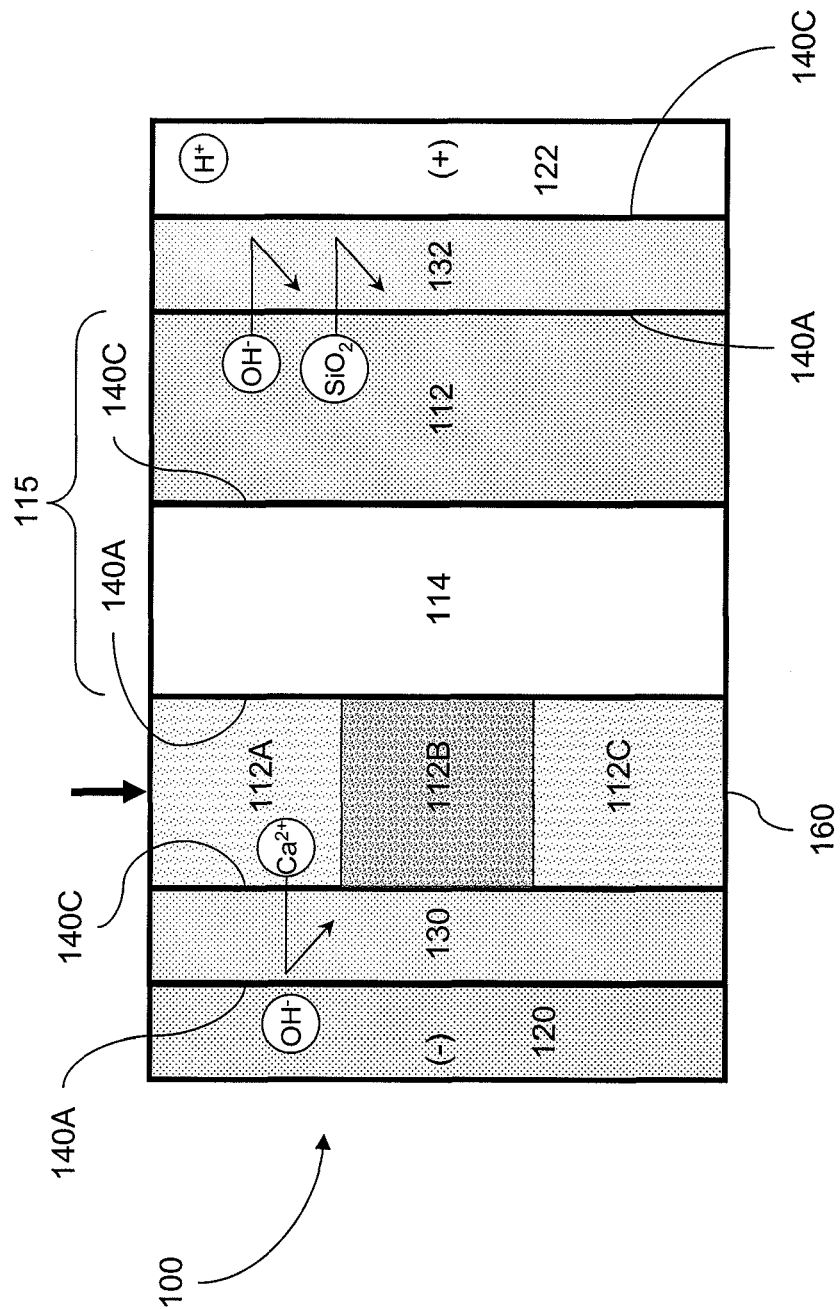
FIG. 1 is a schematic illustration of a portion of an electrodeionization apparatus comprising at least one barrier cell in accordance with one or more embodiments of the invention.

An aspect of the invention can be implemented in the exemplary embodiment presented in FIG. 1 which schematically shows a portion of an electrodeionization apparatus 100. The electrodeionization apparatus typically comprises at least one concentrating compartment 112 and at least one depleting compartment 114, which constitute a cell pair 115, and disposed in ionic communication with each other and, preferably, between and with an anode compartment 120 and a cathode compartment 122. In an advantageous embodiment of the invention, the electrodeionization apparatus can further comprise at least one barrier cell 130 that can trap migrating species. For example, the electrodeionization apparatus 100 can have barrier or neutral cells 130 and 132 disposed adjacent anode compartment 120 and cathode compartment 122. Barrier cells typically provide a buffer for an electrode compartment to separate or prevent species from forming localized scale. Electrodeionization apparatus typically generate hydroxide ions which can raise the pH at localized regions, especially at the points or surfaces conducive to electrolytic reactions. Such localized regions, or even at the electrode compartments, typically have pH conditions much greater than the bulk of the liquid. Because the barrier cells can serve to isolate such high pH regions from scale-forming species transported from the one or more depleting compartments during treatment of the water, thereby inhibiting or at least reducing the potential for scale formation. As exemplarily illustrated in FIG. 1, electrodeionization apparatus 100 can comprise barrier cell 130 that ionically isolates at least one precipitatable component, such as $Ca^{2+}$, from a component, such as $OH^-$, that contributes to scale formation. Typically, one or more of barrier cells 130 can be defined, at least partially, by an anion selective membrane 140A that permits migration of anionic species such as $OH^-$ while inhibiting the further migration of cationic species into an adjacent compartment. As illustrated, a barrier cell 130 can be disposed adjacent concentrating compartment 112. One or more such barrier cells can also further be partially defined by a cation selective membrane 140C. In this manner, for example, a component of a precipitatable compound, such as $Ca^{2+}$, can be inhibited from being introduced into a compartment having localized regions of high pH, such as electrode compartment 120, that typically result from hydroxide species generation.

Other embodiments of the invention can involve barrier cells that separate neutral or weakly ionized, or at least ionizable, species, such as, but not limited to silica, $SiO_2$. Silica can precipitate from the bulk liquid if the concentration is high enough or where a pH change occurs, such as change from a high pH to a neutral pH. In electrodeionization apparatus, silica is typically removed while in its ionized state, at high pH. One or more barrier cells 132 can be disposed to ionically isolate an anode compartment 122 of electrodeionization apparatus 100, wherein hydrogen ions are generated and consequently can have low or neutral pH liquid flowing therein. After silica migrates from depleting compartment 114 into concentrating compartment 112 through anion selective membrane 140A, it is trapped by barrier cell 132 containing high pH liquid flowing therein and inhibited from further migration into the low or neutral pH compartment with neutral or near neutral pH, and thereby reduce the likelihood of polymerizing into silica scale. Cell 132, like cell 130, can be defined, at least partially, by cation selective membrane 140C and anion selective membrane 140A. Barrier cell 132 can thus serve to trap pH-precipitatable species and prevent or at least inhibit precipitation of such species. Barrier cell 132 can also contain, at least partially, anion exchange media and cation exchange media or a mixture of both. Further, one or more of the barrier cells can further comprise inert media or other filler material that can facilitate assembly of the electrodeionization apparatus or provide a desirable characteristic such as resistance or flow distribution during, for example, operation of the apparatus. Likewise, one or more of the concentrating compartments, the depleting compartments, and the electrode compartments can contain, at least partially, a mixture of anion and cation exchange media. Indeed, a mixture of anion and cation exchange media in the concentrating compartments and electrode compartments can further reduce scaling potential by facilitating transport of precipitatable species away from the selective membranes which avoids accumulation of an ionic species that may occur in compartments or regions of compartments with a single type of active exchange media.

In some embodiments of the invention, the anode compartment can contain, at least partially, media that is substantially comprised of oxidation resistant substrate. Thus, for example, durable, highly cross linked ion exchange resin, such as commercially available cation resins, can be used in the anode compartment in which an oxidizing environment may be present. Further, cation exchange resin when utilized in the anode compartment can prevent or inhibit transport of chloride ions to the anode surface where such species may be converted to oxidizing chlorine.

The apparatus of the invention can treat water having hardness of greater than 1 mg/L as $CaCO_3$ or silica content of greater than 1 mg/L, or both. Thus, the apparatus and techniques of the invention are not confined to conventional operating limits and, when used in a treatment system, can obviate at least one unit operation intended to soften the water to be treated or remove silica. This advantageously can reduce capital and operating costs while improving the treatment system's reliability and availability as well as capacity. For example, the treatment systems of the invention, comprising one or more electrodeionization devices described herein, can treat water without a two-pass reverse osmosis (RO) subsystem, while providing water having the same or comparable quality as a system that utilizes a two-pass RO device to remove or reduce the concentration of hardness causing components and silica before an electrodeionization device.

Further aspects of the invention can involve electrodeionization apparatus comprising at least one depleting compartment and/or at least one concentrating compartment having layered media contained therein. For example, one or more depleting compartments 112 of electrodeionization device 100 can comprise a first layer of particles 112A, at least a portion thereof comprising active media that facilitates transport or migration of a first target, typically ionized, species.

Depleting compartment 112 can further comprise a second layer 112B comprising, at least partially, active media that facilitates transport of the first target species and a second target species, or both. First layer 112A can comprise particles having a first effective diameter and second layer 112B can have particles with a second effective diameter. Further embodiments can involve a third layer 112C in depleting compartment 112. Third layer 112C can have active or inert media, or a mixture of both, with a third effective diameter. The effective diameter can be a smallest dimension of a particle. Alternatively, the effective diameter can be an average diameter of the collective particles and is a calculated diameter of an analogous sphere of comparable volume and surface area. For example, the effective diameter of particles in a layer can be a function of the ratio of the volume of a particle to the surface area of a particle or an average of the smallest dimension of the particles. In a preferred configuration, the particles in a downstream layer have an effective diameter that is less than the effective diameter of particles in an upstream layer. For example, particles comprising layer 112C can be spherical particles with a larger effective diameter than the effective diameter of particles comprising layer 112B. Optionally, the effective diameter of the particles comprising layer 112A can be greater than the effective diameter of particles in layer 112B or 112C. One or more of the concentrating compartments may be similarly layered.

In a preferred embodiment, the particles in an upstream layer have an effective diameter that is at least the dimension of interstices between the particles of a downstream layer. In further embodiments, the upstream particles have an effective diameter or a smallest dimension that is less than the smallest dimension of the apertures of distributor 160 that defines an outlet port of depleting compartment 112. Distributor 160 can be a screen that serves to retain the media within the compartments. Thus, each of the depleting compartments and concentrating compartments containing media can have at least one distributor that permits fluid flow therethrough while retaining the media and a layer of media that are sized to retain particles in an upstream layer.

The apertures or openings of distributors are typically designed to retain resins having a diameter of about 500 μm to about 700 μm. Utilizing the configuration of the invention, anion and cation exchange resins may be utilized having smaller dimensions than the aperture dimensions which improves mass transfer kinetics throughout the apparatus. Further, smaller ion exchange resins can improve packing within the compartment and reduces the likelihood of channeling or flow bypass along the compartment walls. Close packed spheres or nearly spherical particles have interstitial spaces of about 0.414 times the radius of the spheres. Thus, the effective diameter of the upstream resin is preferably not less than such dimension. For example, the fine mesh resin beads having an effective diameter of about 62 μm to about 83 μm may be utilized in an upstream layer with a layer of resin beads having a diameter of about 300 μm to about 400 μm. Any of the layers may comprise any suitable fraction of the compartment. The depth of the upstream layer may be dependent on providing a desired performance. Further, advantageous configurations contemplate the use of cation resin beads having a smaller effective diameter or dimension with larger anion resin beads to facilitate cation migration activity. Notable arrangements are not limited to the use of active resin as the lower, downstream media and the invention may be implemented utilizing inert media in one or more of the downstream layers.

The interfaces between the layers may constitute a gradient of small and large resin beads. Thus, the boundary between layers need not be particularly delineated. Other configurations, moreover, can involve a mixture of the fine mesh resin beads mixed with larger resins.

Figure 2:
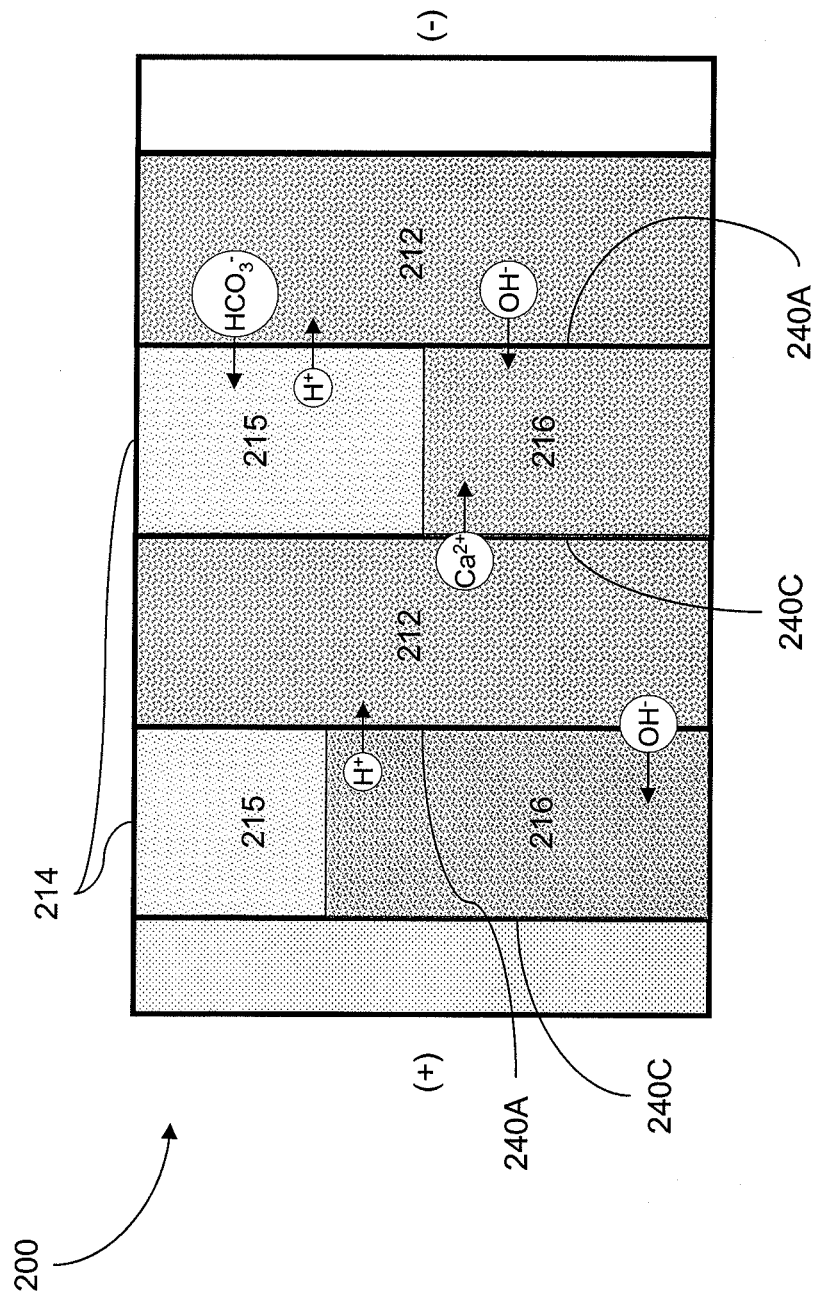
FIG. 2 is a schematic illustration of a portion of an electrodeionization apparatus having layered beds of media in at least one concentrating compartment thereof in accordance with one or more embodiments of the invention.

Another aspect of the invention can involve electrodeionization apparatus comprising at least one concentrating compartment having layered media contained therein. As illustrated in FIG. 2, the electrodeionization device 200 can have at least one concentrating compartment 214 and at least one depleting compartment 212. At least one of the concentrating compartments 214 can have a first layer 215 and a second layer 216. In electrodeionization devices that treat relatively pure water, such as RO permeate, the current efficiency is typically below 100% because, it is believed, of water splitting and transport of the generated hydrogen and hydroxyl ions. This can create local pH fluctuations and can promote scale formation especially where the hydroxyl species reacts with bicarbonate species or carbon dioxide to form carbonate ions which forms calcium carbonate scale.

For example, in a typical electrodeionization apparatus, bicarbonate ions transfer through the anion exchange membrane near the inlet of the compartment but may be inhibited from migrating further from the membrane. When water splitting takes occurs, the hydroxyl species transported through the anion exchange membrane can react with the bicarbonate species to form carbonate which then reacts with calcium to form calcium carbonate scale.

By utilizing layers in one or more of the concentrating compartments, target species can be directed to locations where they are less likely to form scale. As shown in FIG. 2, a layer 215 of anion exchange media can be disposed around the inlet of concentrating compartment 214 to promote migration of bicarbonate species. After the bicarbonate species is transported through the anion exchange membrane 240A, it is promoted through the anion resin of layer 215 and moves towards the cation selective membrane 240C. Even though there are hardness ions passing through cation selective membrane 240C, the pH of the fluid is relatively low around this membrane, which reduces the likelihood of forming carbonate.

The depleting compartments 212 and the other one or more layers 216 of the concentrating compartments 214 may contain mixed anion exchange and cation exchange media.

Figure 3:
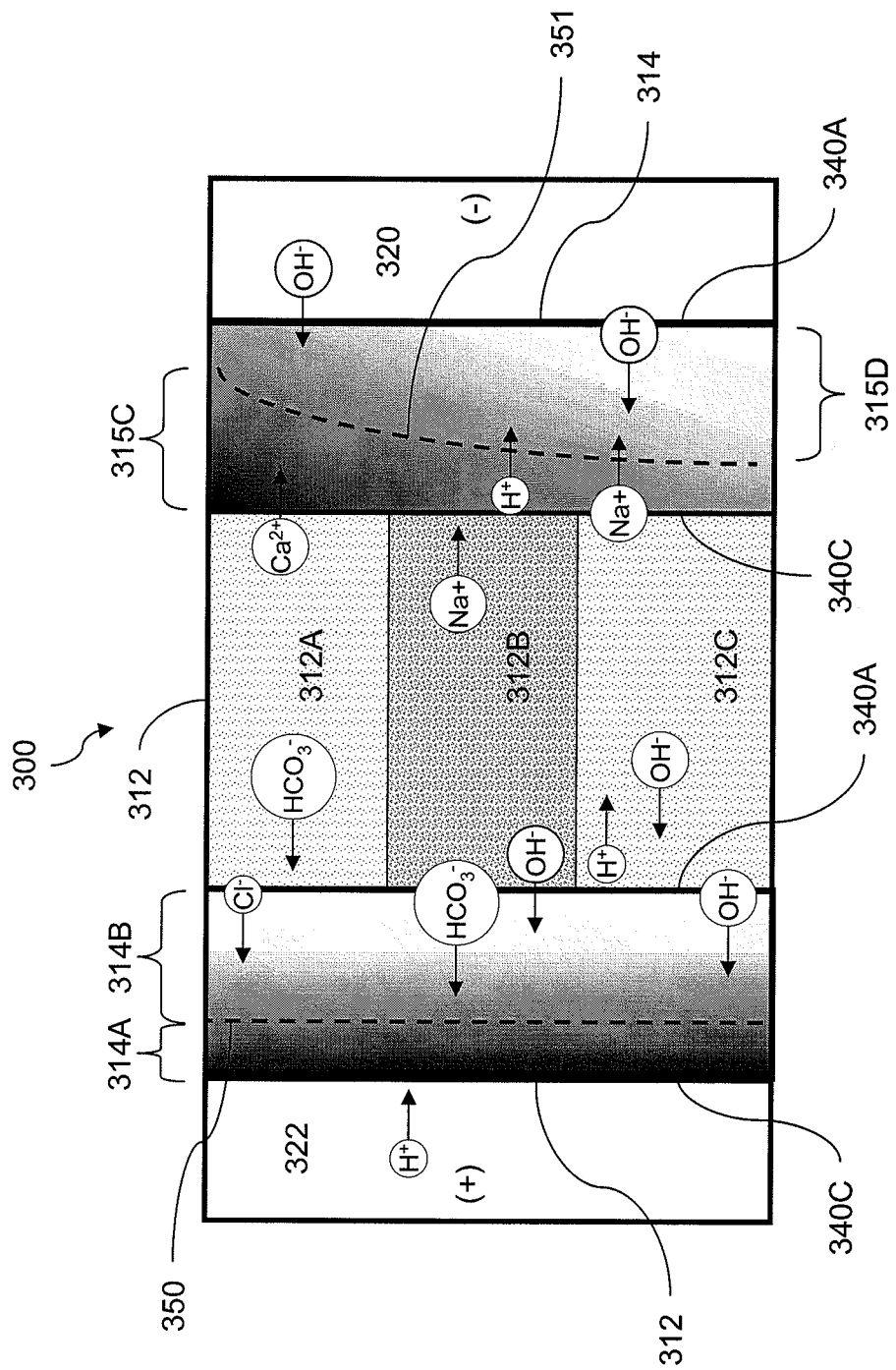
FIG. 3 is a schematic illustration of a portion of an electrodeionization apparatus comprising at least one concentrating compartment having zones of media in accordance with one or more embodiments of the invention.

To further reduce or inhibit scale formation, layers of media can be disposed along a flow path length of the concentrating compartment. As shown in FIG. 3, one or more concentrating cells may comprise, at least partially, a first zone 314A of ion exchange media and a second zone 314B of ion exchange media. The first and second zones may be linearly distributed along the length of the compartment as represented by boundary 350 or may be a gradient of increasing or decreasing amounts of types of ion exchange media in zones 315C and 315D and delineated by gradient boundary 351. The first or second zones may comprise, consist essentially of, or consist of anion exchange media, or cation exchange media. For example, zone 314A can comprise cation exchange media that substantially segregates zone 314B, which comprises anion exchange media, from cation selective membrane 340C. Substantially separating refers to, in some cases, being disposed between a zone and a membrane such that a separating zone comprises or consists essentially of a type of media, which can be anionic, cationic, or inert.

In some cases, the first zone or second zone can be a mixture of differing amounts of types of ion exchange media. For example, zone 315C can comprise, consists essentially of, or consist of cation exchange media adjacent cation selective membrane 340C and zone 315D can comprise, consist essentially of, or consist of anion exchange media, wherein the amount of anion exchange media, relative to the amount of cation exchange media increases, or decreases, along the flow path length or lengthwise dimension, such that a boundary between zones which is defined by gradient boundary 351. In another embodiment, a third zone (not shown) of media can be disposed between the first and second zones. The third zone can comprise, consists essentially of, or consist of inert media, cation exchange media, anion exchange media, mixed media, or mixtures thereof. Further, one or more screens can be used between zones or within the zones to facilitate filling the compartments of the apparatus, which, during operation can also improve flow distribution and further inhibit scale formation. Assembly and filling can also be facilitated by utilizing a binder to secure the media of each zone. For example, media of the first zone can be mixed with a water soluble binder, such as starch. The mixture can then be placed into the compartment. A second mixture of media of the second zone can be similarly prepared and disposed in the compartment.

Zone 314B facilitates transport of anionic species, such as bicarbonate ions, away from anion selective membrane 340A and zone 315C facilitates transport of cationic species, such as calcium ions, away from anion selective membrane 340C. Such segregating zones thus reduce the likelihood of scale formation around membrane surfaces.

As illustrated in FIG. 3, depleting compartment can comprise a first layer 312A of media, a second layer 312B of media, and, optionally, a third layer 312C of media. The first layer can comprise a mixture of anion exchange media, cation exchange media, or inert media. The second layer can comprise, consist essentially of, or consist of anion exchange media or inert media or a mixture thereof. The third layer can comprise, consist essentially of, or consist of anion exchange media, cation exchange media, inert media, or a mixture thereof.

Further aspects of the invention involve systems and techniques that modify the pH of a stream flowing in at least one concentrating compartment of an electrodeionization apparatus. The pH of the stream can be reduced to reduce the likelihood of scale formation by generating and adding an acidic solution to one or more of the concentrate and electrode compartments. The acidic solution can be generated or prepared by utilizing an electrolytic module. Further scale inhibition or tolerance can be effected by degasification of the concentrate liquid. Any acid generating module may be utilized such as those commercially available from Dionex Corporation, Sunnyvale, Calif.

Typically, an electrodeionization device can treat liquids having low hardness. This limitation limits the incoming feed water into electrodeionization devices to a hardness level of 1 ppm or less, as calcium carbonate. To treat water having a hardness value greater than 1 ppm, pretreatment processes such as two-pass RO or a softener post RO, must be used. The additional pretreatment unit operations increase system complexity and cost as well as waste. The electrodeionization devices of the present invention, however, can reliably treat water having higher hardness thereby eliminating or reducing the dependence on such pretreatment operations.

Figure 4:
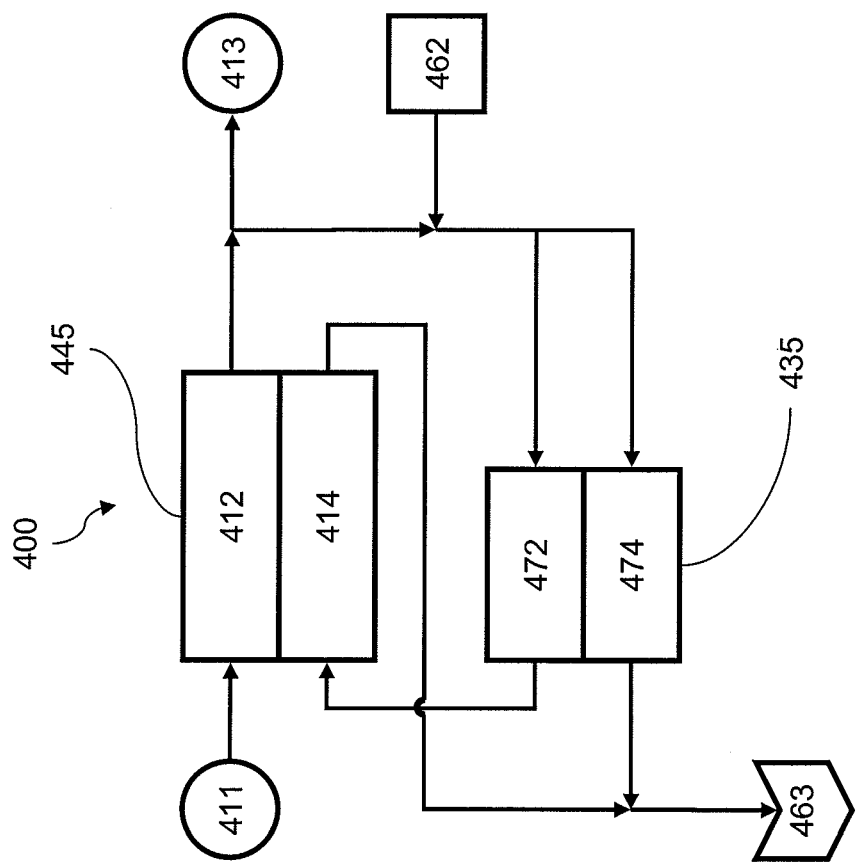
FIG. 4 is a schematic illustration of a portion of a treatment system in accordance with one or more embodiments of the invention.

Addition of an acidic solution into the concentrating compartment of electrodialysis devices to reduce calcium precipitation is known; however adding acidic solutions to electrodeionization devices is not practiced because of low flow velocity of the streams in the concentrate compartments, especially in thick cell compartment. Further, a high quantity of acid is typically required. As illustrated in FIG. 4, the treatment system 400 of the invention can comprise an electrochemical device 435 to produce an acid solution to be introduced into a compartment, typically concentrating compartment 414 of an electrodeionization device 445 disposed to receive water to be treated from source 411. A portion of treated product water from electrodeionization device 445 can be used to facilitate generating the acid solution in an acid-generating compartment 472 of electrochemical device 435. At least a portion of the treated water can be delivered to a point of use 413. A source 462 of a brine solution comprising a salt from, for example, softener brine tank may be introduced into electrolytic module 435 to promote acid solution production. Electrochemical device 435 may be portion of electrodeionization device 445. The brine solution typically comprises sodium chloride.

In some cases, the acidic solution can be introduced into one or more of the depleting and concentrating compartments 412 and 414, as well as the electrode compartments of electrodeionization device 445. Preferably, acidic solution is added in an amount to provide a pH of the exiting stream solution leaving the compartment of between about 2.5 to 4.3 units. Further embodiments may involve neutralizing one or more streams from electrodeionization device 445. For example a basic solution produced from compartment 472 of electrolytic module 435 may be combined to neutralize an outlet stream, typically having a low pH, from concentrating compartment 414 before being discharged to drain 463 or the environment.

Degasification of the concentrate stream to remove carbon dioxide may further reduce or eliminate the precipitation potential in the concentrating compartment. Degasification can be accomplished by the addition of a degasification device or by membrane processes or other methods. Degasification may be relevant when utilizing an acidic solution in the concentrating compartment because of the potential formation of carbon dioxide gas, which can diffuse back through the membrane and reduce product quality. Further, the flow of the stream within the compartment may be countercurrent to facilitate gas removal.

Recirculation of the concentrate compartment using a pump and, optionally, a tank can further enhance the scale inhibition by the acidification and degasification techniques described herein.

Figure 5:
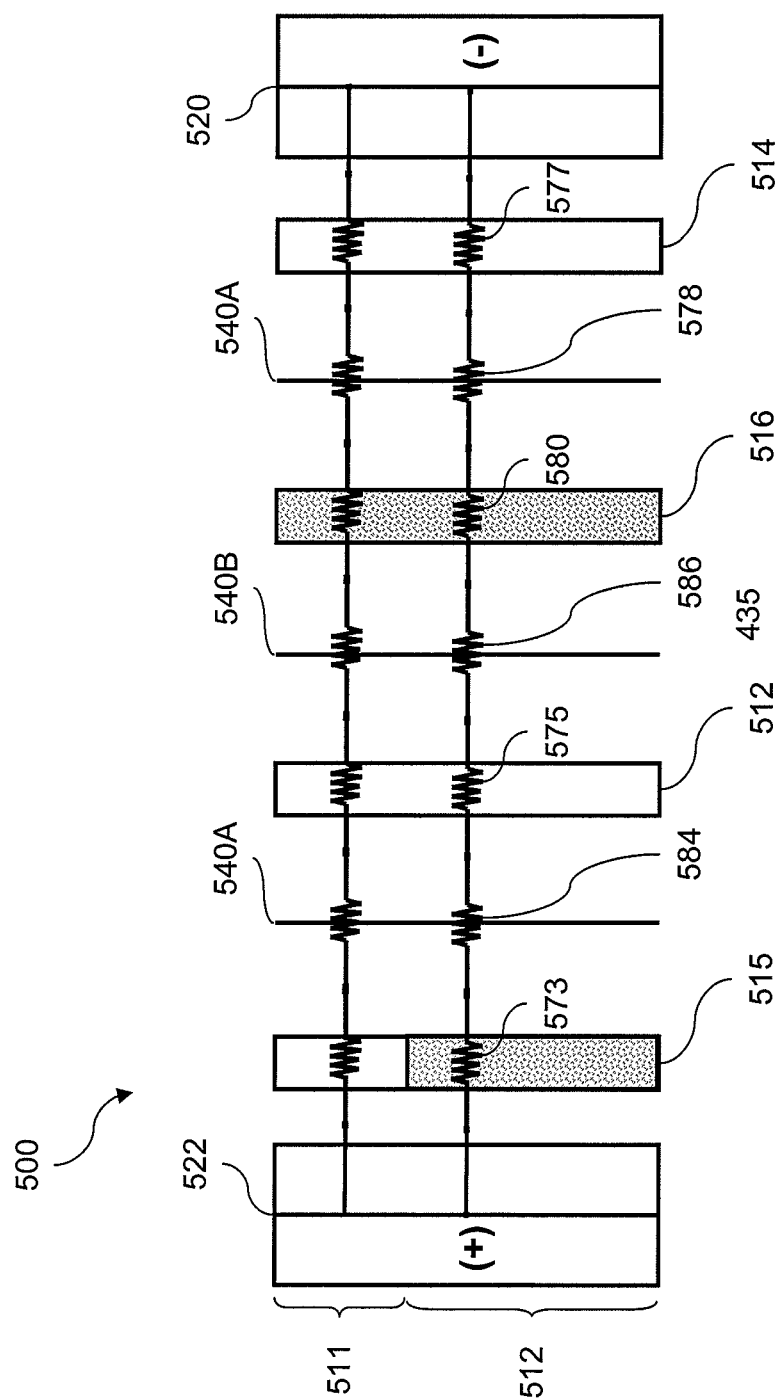
FIG. 5 is a schematic illustration of a portion of an electrodeionization apparatus having at least one compartment modified to reduce the effective resistance or improve the current distribution in other compartments in accordance with one or more embodiments of the invention.

The components, arrangements, and techniques of the invention also provide improved current distribution in an electrodeionization device. As schematically illustrated in FIG. 5, the current resistance through the electrodeionization apparatus 500 between electrodes 520 and 522 can be characterized by a series of compartment resistances 573, 575, and 577, which are representative of the depleting and concentrating compartments 512 and 514, and by membrane resistances 584, 586, and 588, which are representative of anion selective membranes 540A and cation selective membranes 540B. Improved current distribution throughout electrodeionization apparatus 500 can be effected by utilizing at least one concentrating compartment 516 with at least a portion thereof having an effective current resistance 580 that is greater than the effective current resistance of the other compartments, such as the concentrating compartments.

The effective current resistance of a compartment or portion thereof may be modified by mixing inert resin beads, or low or non-conducting materials, with in the concentrating compartment. Selectively increasing the effective current resistance effects a more uniform current distribution through the other compartments. The reduced variations in current throughout the depleting compartments, for example, improve overall performance.

In an electrodeionization device, the electrical resistance may depend on the types of media in the device as well as the active chemical form of those media, i.e., what ions are moving through the media. In a layered bed compartments, the resistance typically vary between the layers because of the different types of resin and the form of the resins. Typically, the strongly charged species or ions are motivated and the water splitting phenomena and weakly ion promotion follow. Thus, media resins near the inlet of the compartment would exchange with the target species in the feed water while media near the outlet would be mostly in the hydrogen and hydroxide forms. Typically, most of the strongly charged ions must be removed, which may not be effected if the feed concentration and/or flow are high enough or if the current is low enough.

If the resistance in the compartments can vary between layers thereof or along the length of the bed, then the current density can also vary accordingly. However, the resistance through the entire module may not just be a function of the resistances of the depleting compartments. The depleting compartments are electrically in series with the membranes and the concentrating compartments and electrode compartments, which may or may not also vary in resistance along their length. If the resistances of the depleting compartments are a small portion of the total resistance through the module, then even if such resistances vary significantly, the overall resistance will be dominated by other factors and current distribution will be more uniform. However, if the depleting compartment resistances are high relative to the other resistances, the current distribution will be affected by resistance differences within the depleting compartments.

Typical electrodeionization devices incorporate screen filled concentrating and/or electrode compartments. In these configurations, the resistance of the water in these compartments is much greater than the resistance of the resin in the depleting compartments in most cases, and therefore, current distribution is not generally controlled by the resistances of the depleting compartments. Filling the concentrating and electrode compartments with resin as well as using lower resistance ion exchange membranes reduces the overall module resistance significantly. However, in certain circumstances this can lead to uneven current distribution as the module resistances become dominated by the resistances of the depleting compartments.

In some embodiments of the invention, therefore, screen filled concentrating and electrode compartments may minimize uneven current distribution. However, in most post RO applications, the water has very low conductivity leading to high module resistance. This high resistance further creates limitations if there are electrical potential constraints. The invention, in contrast, provides comparable performance without using brine injection into the stream flowing into the concentrating compartment thereby reducing operating cost and process complexity.

As noted, mixing inert resin in one or more concentrating and/or electrode compartment as fillers can increase the resistance in those compartments which improves current distribution through the module. As shown in FIG. 5, one or more concentrating compartment 516 can comprise inert resin to provide higher effective resistance 580 therethrough which dominates the collective resistances of other compartments and membranes. Because the dominant resistance controls the overall resistivity, the effective current distribution through the other compartments becomes more uniform. The amount of inert resin can be varied to increase the effective resistance and modify the current distribution through the apparatus. Inert resin can also be used in layers in one or more concentrating and electrode compartments to locally increase the resistance in certain portions where the dilute resistance is determined to be low. Thus, as shown in FIG. 5, current distribution through zone 512 can be matched or made comparable to the current through zone 511 of the apparatus by utilizing a higher resistivity layer in compartment 515 such that the effective resistance 573 of the layer of compartment 515 is increased. The amount of resistance can be effected empirically measuring the effective resistance relative to the amount of inert resin utilized.

Other materials with low conductivity, such as polymeric screens or fiber material can be used to increase the resistance along with the inert resin beads.

Electrodeionization apparatus may be limited to a maximum recovery of 90-95% to prevent scale formation of limited solubility species in the feed water such as hardness and silica. If the feed water contains very low amounts of these species the device should be able to operate at higher recovery rates. Some aspects of the invention involve electrodeionization apparatus having multiple passes through concentrating compartments thereof thereby providing recovery rates. The multiple pass configurations facilitate maintaining a predetermined velocity without a recirculation pump and loop. However, this invention is may be preferably utilized in applications with recirculating loops wherein the feed water ion concentration is low and a very high recovery is desired to avoid wasting or discharging high purity water and/or increasing operating time of the makeup system. In some embodiments of the electrodeionization apparatus of the invention, the fluid flow rate is sufficient to reduce the likelihood of creating dead volumes, channeling and localized overheating within the compartments. For example, the desired fluid flow rate in a compartment can be at least about 2 gallons per minute per square foot in a concentrating compartment. Other fluid flow rates may be dictated by other factors including, but not limited to, the concentration of a component of the precipitating compound, the temperature of the fluid, and the pH of the fluid. Lower velocities may induce channeling.

Figure 6:
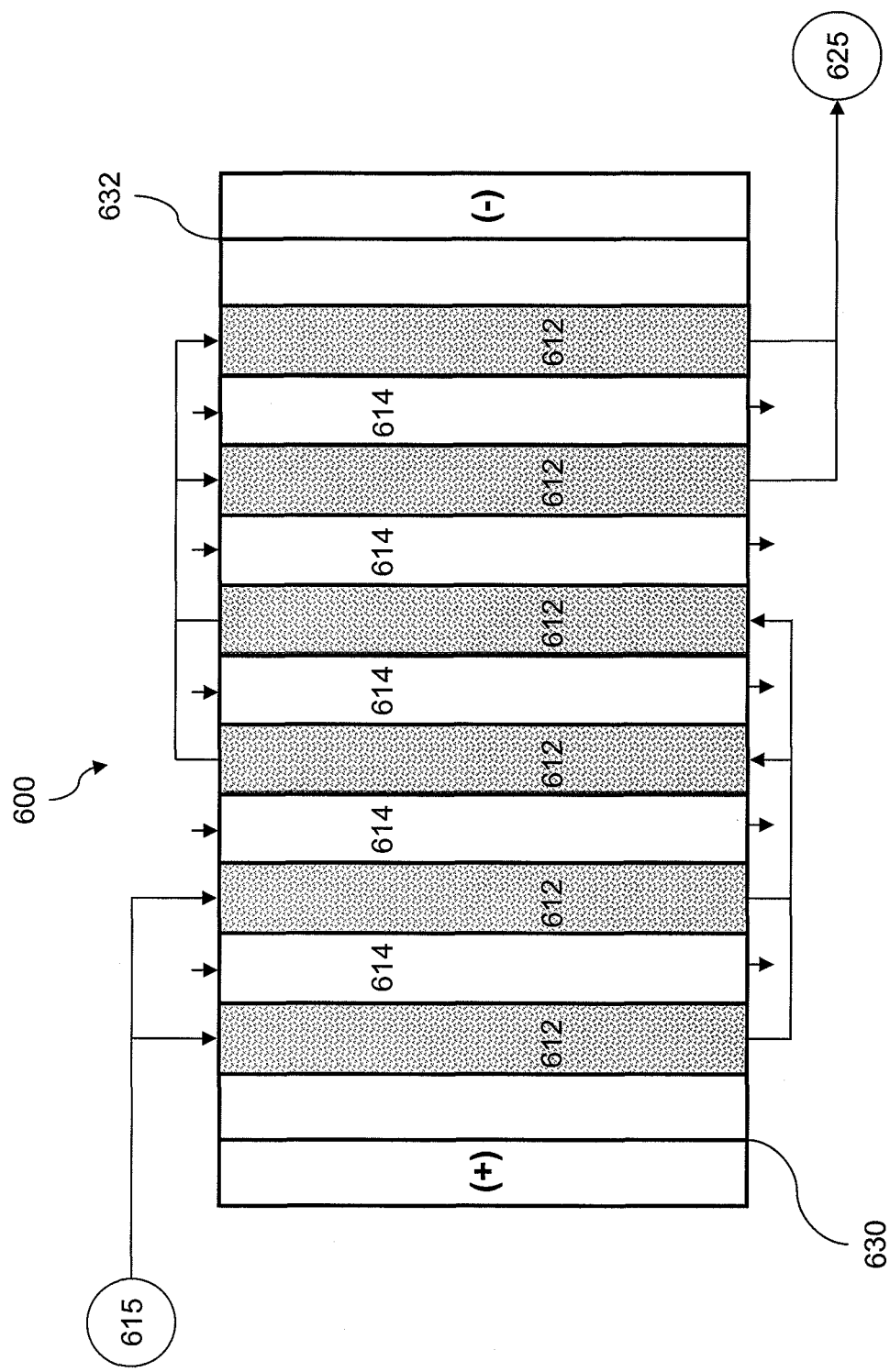
FIG. 6 is a schematic illustration of a portion of an electrodeionization apparatus having a increased effective flow velocity in at least one concentrating compartment thereof in accordance with one or more embodiments of the invention.

FIG. 6 schematically illustrates a portion of an electrodeionization apparatus 600 comprising depleting compartments 614 and concentrating compartments 612 between electrode compartments 630 and 632. The arrangement and configuration provide one depleting compartment pass with an associated plurality of concentrating compartment passes in the treatment apparatus and systems of the invention. Such configurations allow for an increased fluid flow velocity in the concentrating compartments, preferably up to five times greater than the flow rate of a single pass device. As shown in FIG. 6, water from source 615 is sequentially introduced into concentrating compartments 612 and directed into downstream concentrating compartments 612B and then to compartments 612C and to drain or to downstream unit operation 625.

Water to be treated is introduced into depleting compartments 614 and directed to point of use without following or tracking the flow of water through compartments 612, 612A, and 612B. The invention, however, is not limited to the number of associated concentrating compartment volumes relative to the number of depleting compartment volumes and any ratio of concentrating compartments to depleting compartments can be used to provide a desired high fluid flow rate through the compartments.

Different size cation and anion exchange resin beads in the mixed layers or compartment may be utilized to further reduce the transport rate of the larger bead counter-ions and facilitate transport of the smaller bead counter-ions.

Ion transport typically occurs through the ion exchange resins. Successful transport may thus depend on a complete path of like material between the beads and the membranes. A cationic species typically diffuses onto a cation resin bead and will tend to move toward the cathode following a path of cationic media until it reaches the cation selective membrane and passes through into the concentrating compartment. If the path is broken, the cationic species will have to diffuse out of the last bead and into the bulk solution, therefore reducing the chance it will be picked up later in the bed and increasing the chance it will end up in the product water. The path can be broken by poor packing such that the beads don't have good contact or it can be broken by a bead of the opposite charge.

Using a relatively thin cell or tightly packing the resins can increase the probability of maintaining the desired pathway. Utilizing cation and anion exchange resin of a similar and relatively uniform size will also increase the likelihood of maintaining the desired pathway. Using cation and anion exchange resin of different sizes, however, can block transfer.

In some cases, it may be advantageous to inhibit transport of either cations or anions. By selectively reducing the size of one type of resin in a mixed bed, the transfer of the smaller bead counter-ions will be enhanced due to more complete paths whereas the transfer of the larger bead counter-ions will be retarded due to fewer complete paths because as the size of the smaller beads approaches some fraction of the size of the larger beads, smaller resin beads tend to pack around the larger beads, which isolates and breaks the path from one large bead to the next. This phenomenon may also depend on the relative ratio of the large and small ion exchange resin beads. For example a mix of 50% small beads by volume would affect the transport of ions much differently than a mix of 25% or 75% small beads by volume.

Figure 7B:
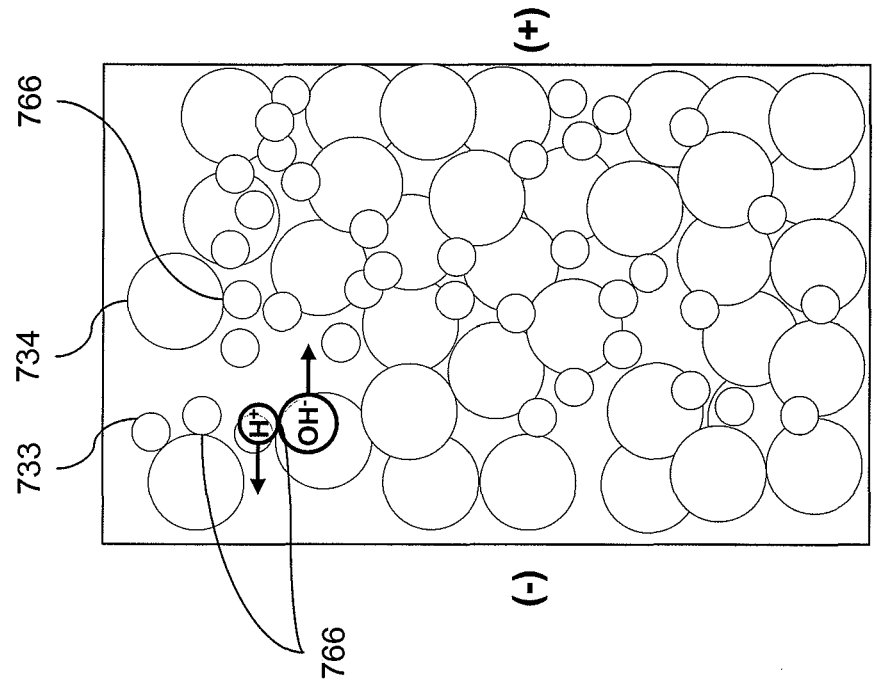
FIGS. 7A and 7B is a schematic illustration of a portion of an electrodeionization apparatus comprising a compartment containing resin beads of differing sizes in accordance with one or more embodiments of the invention.
Figure 7A:
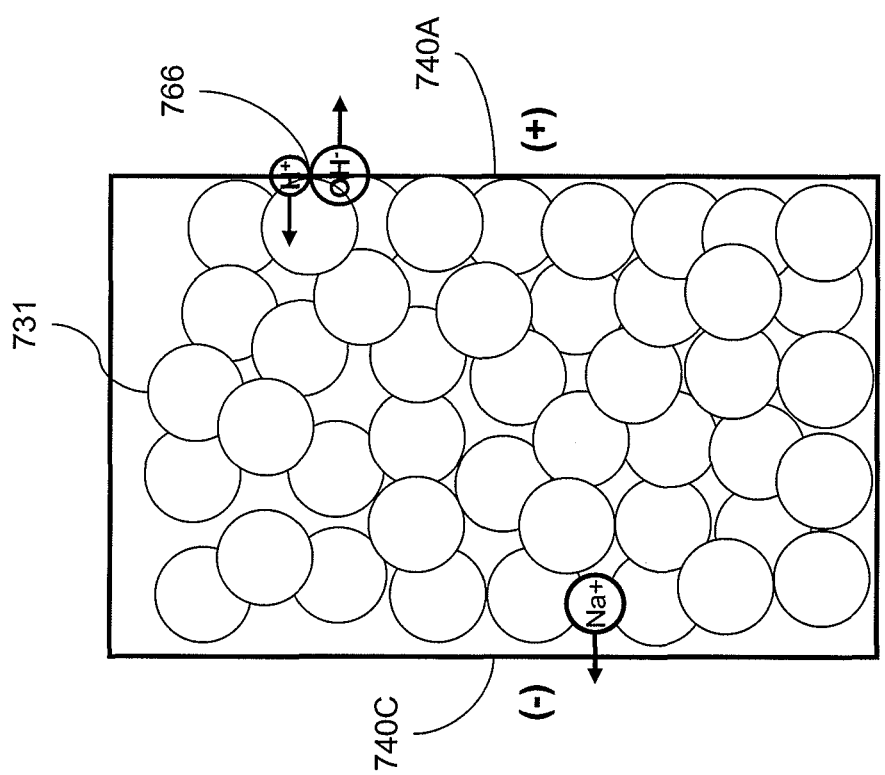

Once the size and mix ratios of the media are appropriately selected to slow transport of a target or selected type of ion and increase transport of different type, hydrogen or hydroxyl ions must be transferred to maintain electro neutrality. For example, if a bed consisting essentially of cation resin is used in a depleting compartment as shown in FIG. 7A, cationic species would migrate through the cation exchange resin beads 731 and the cation membrane 740C into an adjacent concentrating compartment. Water would split at site 766 of the anion selective membrane 740A which creates a hydrogen ion that replaces the migrating cation in the depleting compartment and a hydroxyl ion which migrates into an adjacent concentrating compartment which neutralizes the cationic species migrating from another depleting compartment (not shown). This phenomenon relies on the ability to split water on the surface of the anion membrane where there is relatively little contact area between the anion membrane and cation beads. Utilizing smaller cationic exchange resin beads 733 with larger anionic exchange resin beads 734, as illustrated in FIG. 7B, reduces the transport rate of anionic species. Further, the use of differing resin bead sizes provides additional water splitting sites 766 at the tangents between the cation exchange resin 733 and anion exchange resins beads 734, which in turn improves performance by reducing the resistance across the module.

For example, an electrodeionization apparatus of the invention can comprise a compartment containing a mixture of anion exchange resins and cation exchange resins, the cation exchange resins having an average diameter at least 1.3 times greater than an average diameter of the anion exchange resins. Alternatively or in addition, the electrodeionization apparatus can comprise a compartment containing a mixture of anion exchange resins and cation exchange resins, the cation exchange resins having an average diameter at least 1.3 times greater than an average diameter of the anion exchange resins.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

This example describes the effect of temperature on the Langelier Saturation Index (LSI).

Figure 8:
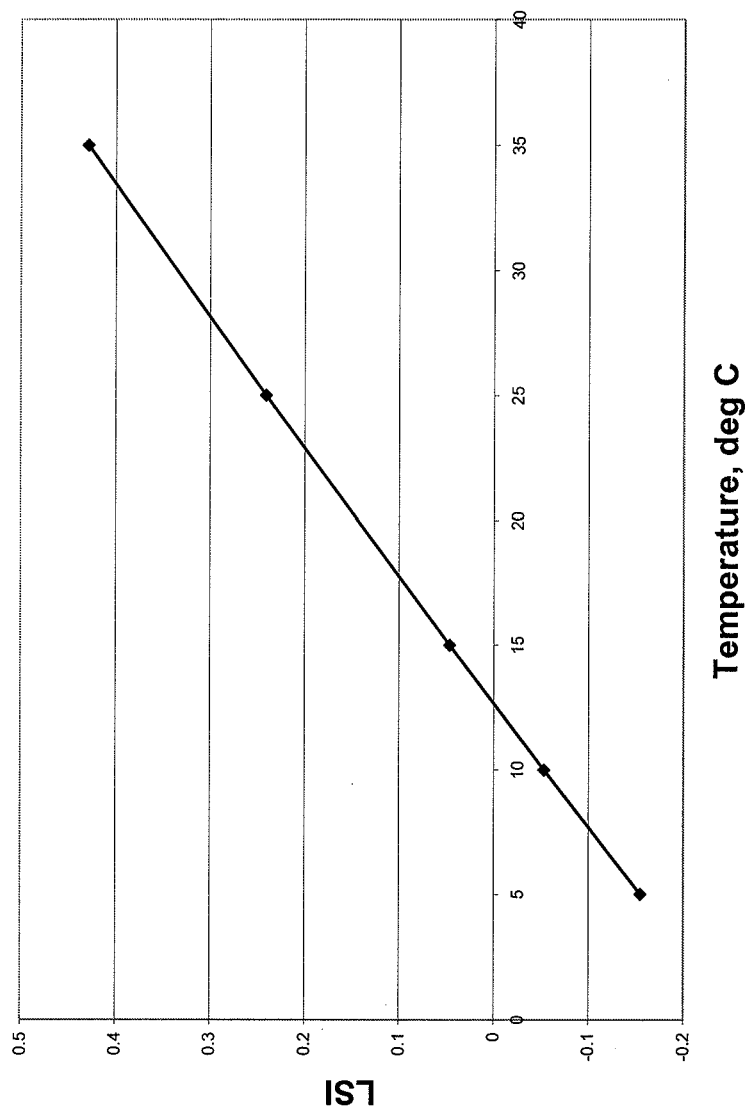
FIG. 8 is a graph showing the relationship between an Langelier Saturation Index value of a water stream relative to the temperature of the water stream.

Calculating an LSI value is known in the art for a measure of the potential for scale formation. LSI is a function of pH, total dissolved solids (TDS), temperature, total hardness (TH), and alkalinity. Using the following estimates for these parameters for a concentrating compartment stream of an electrodeionization apparatus, the temperature of the stream relative to the LSI value can be defined and a representative relationship is shown in FIG. 8, based on a stream with a pH of 9.5 units, TDS of 30 ppm, TH of 15 ppm, as $CaCO_3$, and an alkalinity of about 25 ppm, as $CaCO_3$.

When the LSI value of a stream, is positive scaling is likely to occur. To inhibit scaling, the LSI value of the stream is reduced to, preferably a negative quantity. FIG. 8 shows that as the temperature is reduced the LSI value is reduced to below zero around 12.5° C. Thus, for the conditions described above, cooling the stream into the concentrating compartment of an electrodeionization device to below 12.5° C. should reduce the likelihood or prevent the formation of scale.

Cooling can be effected by thermally coupling a heat exchanger, or chiller, upstream of the electrodeionization apparatus. Other components and subsystems that facilitate removing thermal energy from the one or more streams into the apparatus may be utilized. For example, one or more sensors and controllers may be utilized to define a temperature control loop and facilitate maintaining the temperature of the stream to a target temperature or even to reduce the effective LSI value to a desired or target amount.

The target temperature can be determined empirically, by defining a temperature of the stream to be introduced into a concentrating compartment of the electrodeionization device, or be calculated based at least partially on the calculated LSI value. For example, an empirically established target temperature can be a temperature at which no scaling is historically observed with or without an additional margin to ensure that the scaling is further inhibited. An LSI-based target temperature may be defined based on a derived LSI-temperature relationship then calculating the target temperature associated with a set reduction in LSI value.

Example 2

In this example, the effect of resin bead size on the performance of an electrodeionization apparatus in accordance with one or more aspects of the invention was studied.

In one test, an electrodeionization module was constructed using an equal mixture of anion resin with an average bead diameter of 575 μm and a cation resin with an average bead diameter of 350 μm in the depleting compartments. Both of these resins were uniform particle size according to industry standards.

The module was fed a water that was previously treated by reverse osmosis and contained about 0.5 ppm Mg and 1.5 ppm Ca (both as $CaCO_3$) with a pH of about 6.1. The module was operated at almost 100% current efficiency and product quality was about 1-2 MΩ-cm without almost zero silica removal.

The product water hardness level was below detection as measured by a Hach spectrophotometer (<10 ppb) and the pH was reduced to about 5.7. This indicates that the module was preferentially removing cations over anions.

Example 3

In this example, the effect on the performance of an electrodeionization apparatus with several layers of different bead sizes in compartments thereof in accordance with one or more aspects of the invention, was studied.

A module was constructed with three layers of ion exchange resin in the depleting compartments. The first and last layers consisted of an even mix of cation and anion resin of uniform particle diameters approximately 600 μm. The middle layer consisted of an even mix of cation exchange and anion exchange resins with particle diameters of 150-300 μm. The module spacer had slots in the flow distributor, which are used to hold resins in place, with a width of 254 μm. The module was operated for several months with no change in pressure drop, which indicates that the resins in the middle layer, of which some were smaller than the spacer apertures, did not pass through the bottom layer of resin and exit the module.

In addition, the addition of the middle layer of smaller resins improved the performance of a comparable electrodeionization device, control module. The module was operated in parallel with another electrodeionization module having compartments containing an even mix of cation exchange and anion exchange resins with particle diameters of about 600 μm. With a feed water previously treated by reverse osmosis having a conductivity of about 30 μS/cm and containing 3.75 ppm of $CO_2$, the module comprising a layer of smaller ion exchange resins produced water having a resistivity of 16.4 MΩ-cm whereas the other typical module, without a layer of smaller ion exchange resins, produced water having a resistivity of 13.5 MΩ-cm. Further, the module comprising the layer of smaller exchange resins showed a silica removal of 96.6% versus 93.2% for the control module.

Example 4

In this example, the effect on the performance of an electrodeionization apparatus with several or multiple passes through concentrating compartments thereof was studied.

An electrodeionization module was assembled with four depleting compartments, three concentrating compartments, and two electrode compartments.

All of the depleting compartments were fed a water to be treated in to parallel to each other.

The concentrating compartment and electrode compartments were fed in series so that the stream introduced into the concentrating compartments entered the cathode compartment first, then flowed sequentially through the concentrating compartments and finally through the anode compartment. This contrasts with the conventional configuration in which a water stream is typically fed into the electrode compartments in parallel with a water stream into the concentrating compartments. The module thus had five effective concentrating compartment passes.

Data for this module (labeled as "Series Concentrate") along with performance data for a standard module operating with parallel flows (labeled as "Parallel Concentrate") is listed in Table 1 below. The data show that by serially arranging the stream to flow through the concentrating and electrode compartments, a fluid flow velocity similar to that when operating in parallel at a much lower reject flow rate. Therefore very high recoveries can be obtained while maintaining a minimum velocity in the concentrate.

TABLE 1

Comparison of module with single pass concentrate versus module with five passes.

| Module | Parallel Concentrate | Series Concentrate |
|---|---|---|
| Feed, μS/cm | 30.3 | 30.3 |
| Electrical resistance, Ohms | 4.3 | 4.2 |
| Product quality, MΩ-cm | 3.1 | 3.6 |
| Product flow, gpm | 2.25 | 2.25 |
| Concentrate flow, gph | 7.2 | 1.2 |
| Recovery, % | 94.9 | 99.1 |
| Concentrate velocity, gpm/ft² | 2.0 | 1.7 |

Example 5

In this example, the effect on the performance of an electrodeionization apparatus with horizontal and vertical layers in the concentrating compartment was studied.

Figures 9A, 9B:
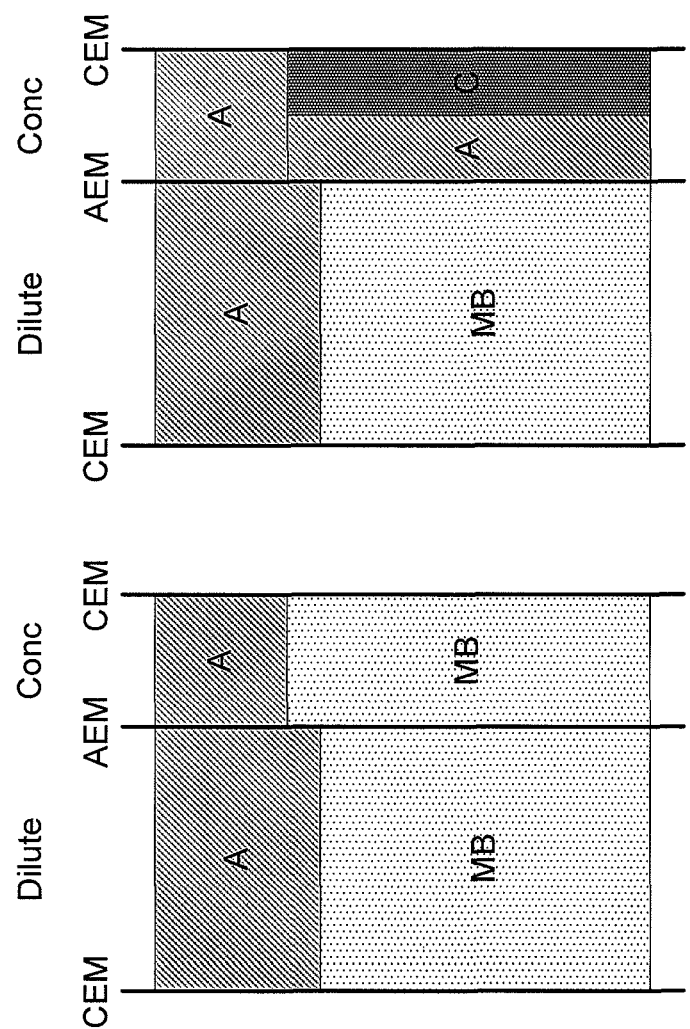

Two modules were assembled with different layering configurations as shown in FIGS. 9A and 9B. Each module was comprised of four of of the respectively illustrated repeating cell pairs. In the figures, "MB" refers to a mixture or resins; "A" and "C" refer to zones or layers comprising anion exchange resin and cation exchange resin, respectively; and "AEM" and "CEM" refer to the anion selective membrane and cation selective membrane. The modules were operated for two and three weeks respectively with feed water having a conductivity of about 10 μS/cm and containing 2 ppm total hardness, as calcium carbonate.

After this period they were opened and no scale was observed. In contrast, a non-layered module containing mixed bed resin in the depleting and concentrating compartments showed scale on the anion membranes in the concentrate after two weeks of operation on the same feed water.

Example 6

In this example, the effect on the performance of an electrodeionization apparatus with vertical layers in compartments thereof along with addition of an acidic solution, was studied.

Three modules were assembled with horizontal layering in the depleting compartment and vertically oriented zones or layers, along the flow path length, in the concentrating compartments. Barrier cells were also disposed adjacent both electrode compartments. The modules were operated for ninety days with post-RO feed water containing about 2 ppm of total hardness. An acidic solution was injected into the concentrating compartments at rate that provide a pH of the water stream exiting the concentrating compartments of about 2.5-3.5.

Figure 10:
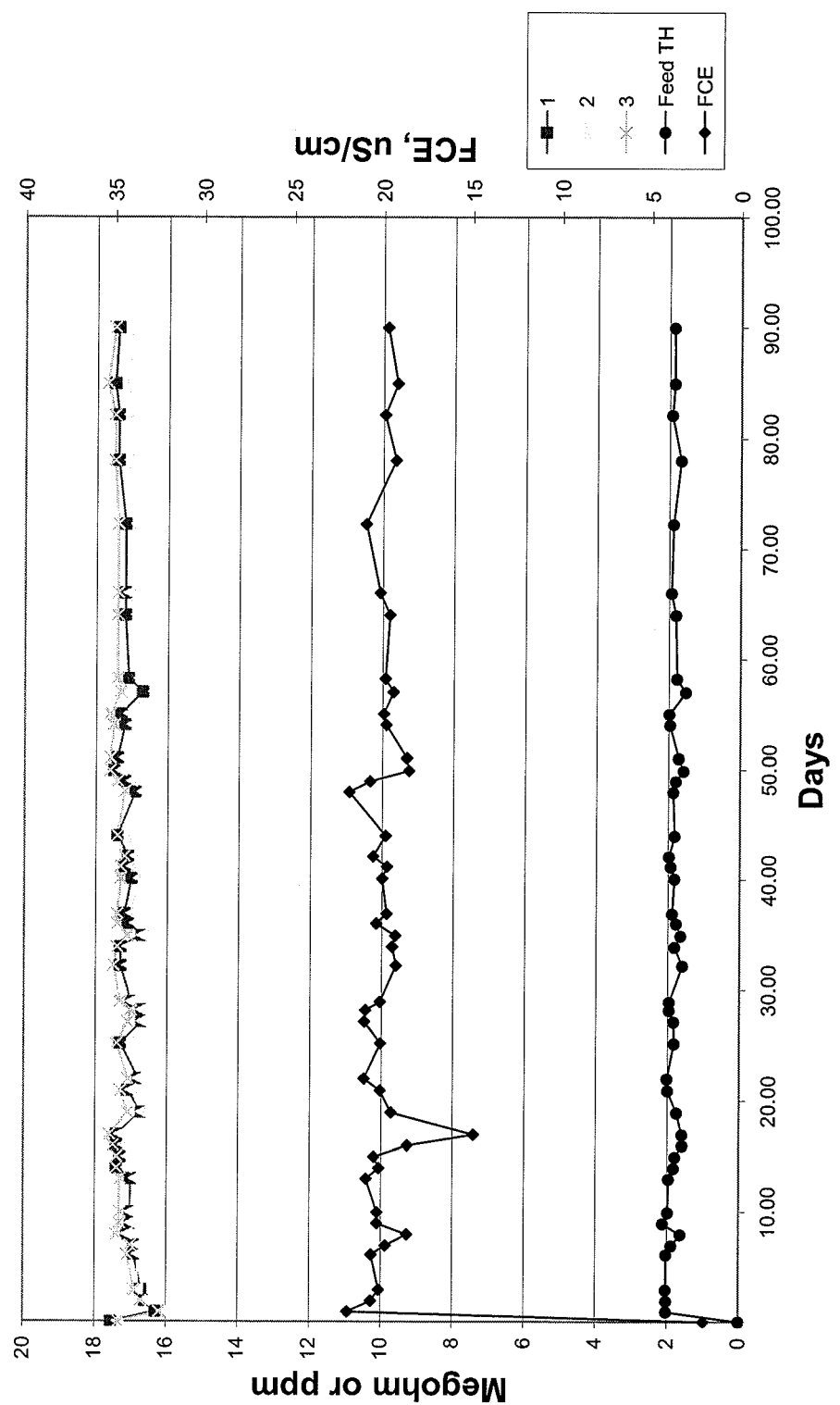
FIG. 10 is a graph showing the performance of electrodeionization apparatus in accordance with one or more embodiments of the invention.

FIG. 10 shows stable performance over the entire ninety days. In the figure, "FCE" refers to feed conductivity equivalent, which is calculated by adding the actual feed conductivity, in μS/cm, to the feed carbon dioxide, in ppm, times 2.67 and the feed silica, in ppm times, 1.94; and "Feed TH" refers to feed total hardness.

The controller of the system of the invention may be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for analytical systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the treatment system and/or computer system. Software, including programming code that implements embodiments of the invention, can be stored on a computer readable and/or writeable nonvolatile recording medium, and then typically copied into memory wherein it can then be executed by the processor. Components of the computer system may be coupled by an interconnection mechanism, which may include one or more busses (e.g., between components that are integrated within a same device) and/or a network (e.g., between components that reside on separate discrete devices). The interconnection mechanism typically enables communications (e.g., data, instructions) to be exchanged between components of the computer system. The computer system can also include one or more input devices, for example, a keyboard, mouse, trackball, microphone, touch screen, and one or more output devices, for example, a printing device, display screen, or speaker. In addition, the computer system may contain one or more interfaces that can connect the computer system to a communication network (in addition or as an alternative to the network that may be formed by one or more of the components of the computer system).

According to one or more embodiments of the invention, the one or more input devices may include sensors for measuring parameters. Alternatively, the sensors, the metering valves and/or pumps, or all of these components may be connected to a communication network that is operatively coupled to the computer system. The controller can include one or more computer storage media such as readable and/or writeable nonvolatile recording medium in which signals can be stored that define a program to be executed by one or more processors. Storage medium may, for example, be a disk or flash memory. Although the computer system may be one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which in turn, can be communication through one or more networks.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

U.S. Provisional Patent Application Ser. No. 60/805,505, filed on Jun. 22, 2006, titled ENHANCED HARDNESS TOLERANCE OF CEDI MODULES, and U.S. Provisional Patent Application Ser. No. 60/805,510, filed on Jun. 22, 2006, titled METHODS TO REDUCE SCALING IN EDI DEVICES, are incorporated herein by reference.

What is claimed is:

1. An electrodeionization apparatus comprising:
a depleting compartment having a first depleting layer of a first ion exchange media and a second depleting layer of a homogenous anion exchange media positioned above the first depleting layer to form a depleting layer interface at a first level; and
a concentrating compartment in ionic communication with and adjacent the depleting compartment and defined by an anion selective membrane and a cation selective membrane, the concentrating compartment having a first concentrating layer of a third ion exchange media and a second concentrating layer of the homogenous anion exchange media positioned above the first concentrating layer to form a concentrating layer interface at a second level that is different from the first level.

2. The apparatus of claim 1, wherein the first ion exchange media is a mixture of anion exchange media and cation exchange media.

3. The apparatus of claim 1, wherein the third ion exchange media is a mixture of anion exchange media and cation exchange media.

4. The apparatus of claim 1, wherein the first concentrating layer of the third ion exchange media includes a first zone comprised of cation exchange media that is separated from the anion selective membrane by a second zone comprised of anion exchange media.

5. A method of mitigating scale formation during the treatment of water comprising:
  providing an electrodeionization device comprising;
    a depleting compartment having a first depleting layer of a first ion exchange media and a second depleting layer of a homogenous anion exchange media positioned above the first depleting layer to form a depleting layer interface at a first level;
    a concentrating compartment in ionic communication with and adjacent the depleting compartment and defined by an anion selective membrane and a cation selective membrane, the concentrating compartment having a first concentrating layer of a third ion exchange media and a second concentrating layer of the homogenous anion exchange media positioned above the first concentrating layer to form a concentrating layer interface at a second level that is different from the first level; and
  instructing the use of the electrodeionization device to treat the water.

* * * * *